US012608500B1

(12) United States Patent
Scudder et al.

(10) Patent No.: US 12,608,500 B1
(45) Date of Patent: *Apr. 21, 2026

(54) METHOD AND COMPUTER PROGRAM PRODUCT FOR DETECTING AND PREVENTING SUCCESSFUL ATTACKS AT ENDPOINTS IN A VALIDATION ARCHITECTURE SYSTEM USING COMPARISON OF INDICIA OF A REQUEST TO BE PERFORMED AT MULTIPLE NODES

(71) Applicant: Gravic, Inc., Malvern, PA (US)

(72) Inventors: Kenneth J. Scudder, Bradenton, FL (US); Bruce D. Holenstein, Media, PA (US); Dylan R. Holenstein, Newtown Square, PA (US); Paul J. Holenstein, Downingtown, PA (US)

(73) Assignee: GRAVIC, INC., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/188,734

(22) Filed: Apr. 24, 2025

Related U.S. Application Data

(63) Continuation of application No. 18/961,285, filed on Nov. 26, 2024, now Pat. No. 12,299,163.

(51) Int. Cl.
*G06F 16/00* (2019.01)
*G06F 16/27* (2019.01)
*G06F 21/62* (2013.01)
*H04L 9/40* (2022.01)

(52) U.S. Cl.
CPC .......... *G06F 21/6218* (2013.01); *G06F 16/27* (2019.01); *H04L 63/1441* (2013.01)

(58) Field of Classification Search
CPC ... G06F 21/6218; G06F 16/27; H04L 63/1441
See application file for complete search history.

(56) References Cited

U.S. PATENT DOCUMENTS

| | | |
|---|---|---|
| 4,845,715 A | 7/1989 | Francisco |
| 8,370,911 B1 | 2/2013 | Mallard |
| 9,509,720 B2 | 11/2016 | Shenefiel et al. |

(Continued)

OTHER PUBLICATIONS

"New Data Integrity Architectures for Mission Critical Systems." "The Connection" journal, Nov. 2021, Accessed from web page: https://connect2nonstop.com/new-data-integrity-architectures-for-mission-critical-systems/ (accessed Mar. 20, 2023), 16 pages.

*Primary Examiner* — Alexander Khong
(74) *Attorney, Agent, or Firm* — Clark A. Jablon

(57) ABSTRACT

Databases of a multi-node system each have a first subset of data that match each other and which are intended to be kept in synchronization with each other. At least one of the databases has a second subset of data that intentionally does not match a subset of data in at least one of the other databases and which is not kept in synchronization with the at least one of the other databases. Each node receives a plurality of matching request requests to perform an action on data in the database associated with each node. Indicia of the request to be performed on data in the database associated with each node is computed and is sent to a comparator which outputs a comparison result for each of the matching requests. First or second follow-up actions are performed respectively when the result of the comparison shows a match or mismatch.

18 Claims, 13 Drawing Sheets

(56) References Cited

U.S. PATENT DOCUMENTS

| | | | |
|---|---|---|---|
| 9,734,190 B1 | 8/2017 | Holenstein et al. | |
| 9,922,074 B1 | 3/2018 | Hoffmann et al. | |
| 10,452,648 B1 * | 10/2019 | Holenstein | G06F 16/2379 |
| 10,467,223 B1 * | 11/2019 | Holenstein | G06F 16/2365 |
| 10,642,826 B1 * | 5/2020 | Holenstein | G06F 16/273 |
| 10,706,040 B1 * | 7/2020 | Holenstein | G06F 11/1474 |
| 10,740,300 B1 * | 8/2020 | Lakshman | G06F 16/137 |
| 11,599,528 B1 | 3/2023 | Holenstein et al. | |
| 11,768,822 B1 * | 9/2023 | Holenstein | G06F 16/2358 |
| | | | 707/703 |
| 11,782,907 B1 | 10/2023 | Holenstein et al. | |
| 12,118,116 B1 | 10/2024 | Holenstein et al. | |
| 2002/0194189 A1 | 12/2002 | Anderson | |
| 2005/0079859 A1 | 4/2005 | Eakin | |
| 2009/0248915 A1 | 10/2009 | Sato | |
| 2013/0060738 A1 | 3/2013 | Koponen | |
| 2014/0380402 A1 | 12/2014 | Roth | |
| 2018/0307859 A1 | 10/2018 | LaFever et al. | |
| 2018/0343258 A1 | 11/2018 | Spies et al. | |
| 2019/0286490 A1 | 9/2019 | Wang | |
| 2020/0066072 A1 | 2/2020 | Galvez et al. | |
| 2020/0175168 A1 | 6/2020 | Völp et al. | |
| 2020/0344070 A1 | 10/2020 | Li | |
| 2021/0182423 A1 | 6/2021 | Padmanabhan | |
| 2021/0226774 A1 | 7/2021 | Padmanabhan | |
| 2021/0241241 A1 | 8/2021 | Lokanath | |
| 2021/0243193 A1 | 8/2021 | Padmanabhan | |
| 2021/0281417 A1 | 9/2021 | Xu | |
| 2022/0066891 A1 | 3/2022 | Pochuev | |
| 2022/0329595 A1 | 10/2022 | Wynter et al. | |
| 2023/0199236 A1 | 6/2023 | McGill | |
| 2023/0269195 A1 | 8/2023 | Arumugam et al. | |

* cited by examiner

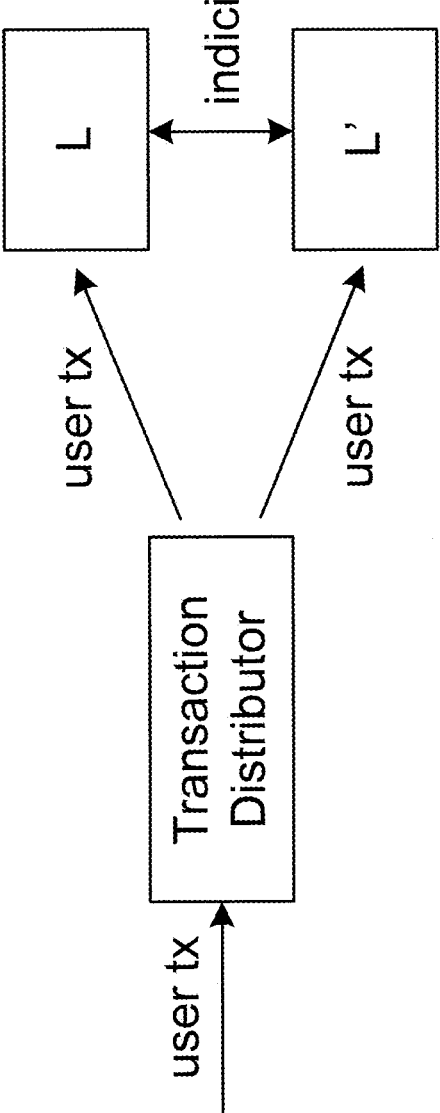
Figure 1: PRIOR ART: Dual Server Reliability Validation Architecture

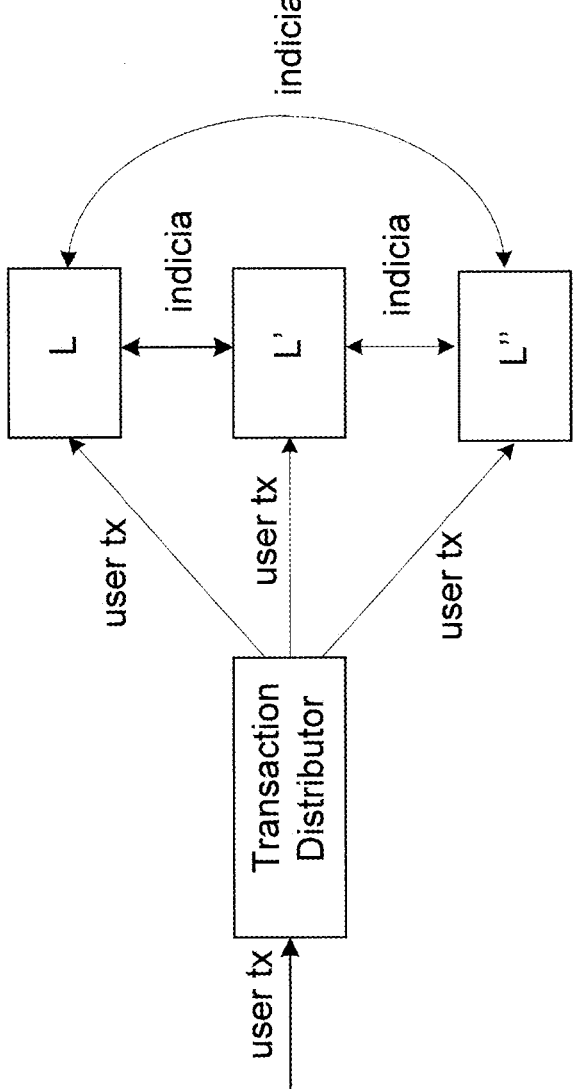
Figure 2: PRIOR ART: Triple Server Reliability Validation Architecture

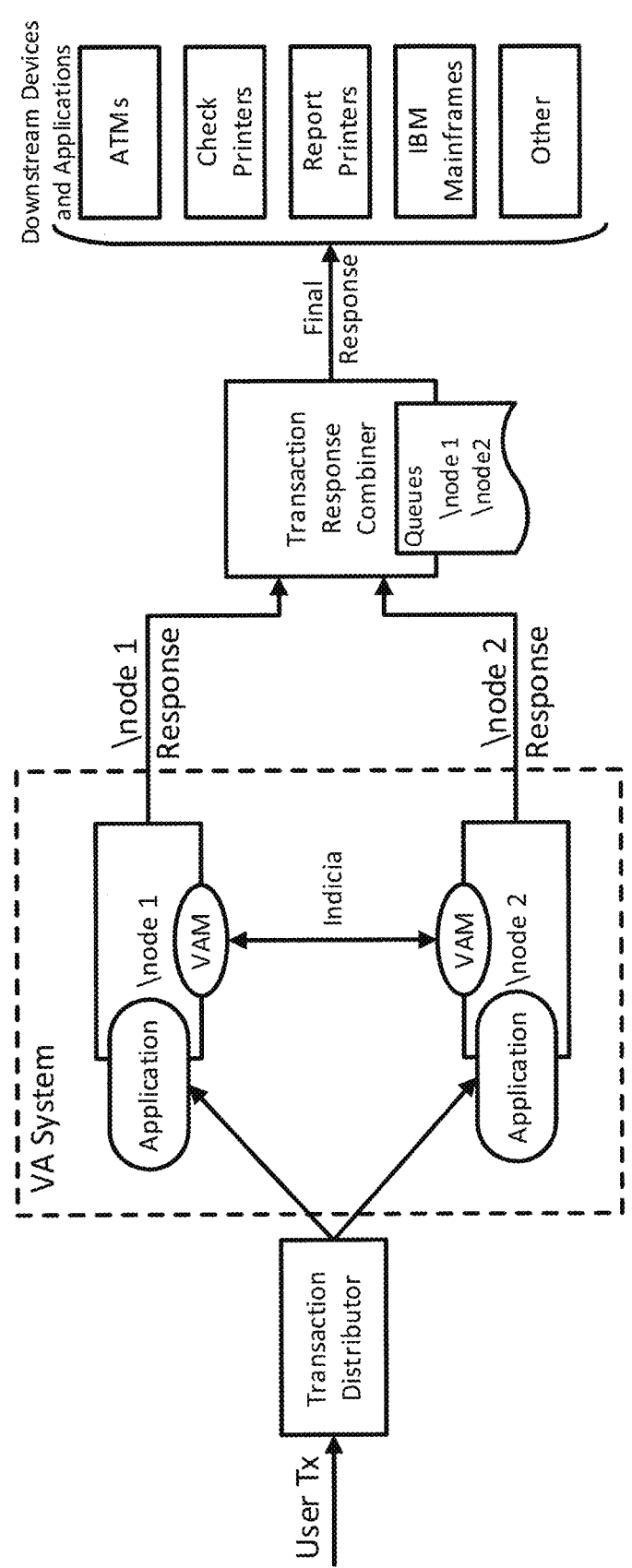
Figure 3: PRIOR ART: Validation Architecture Application Framework

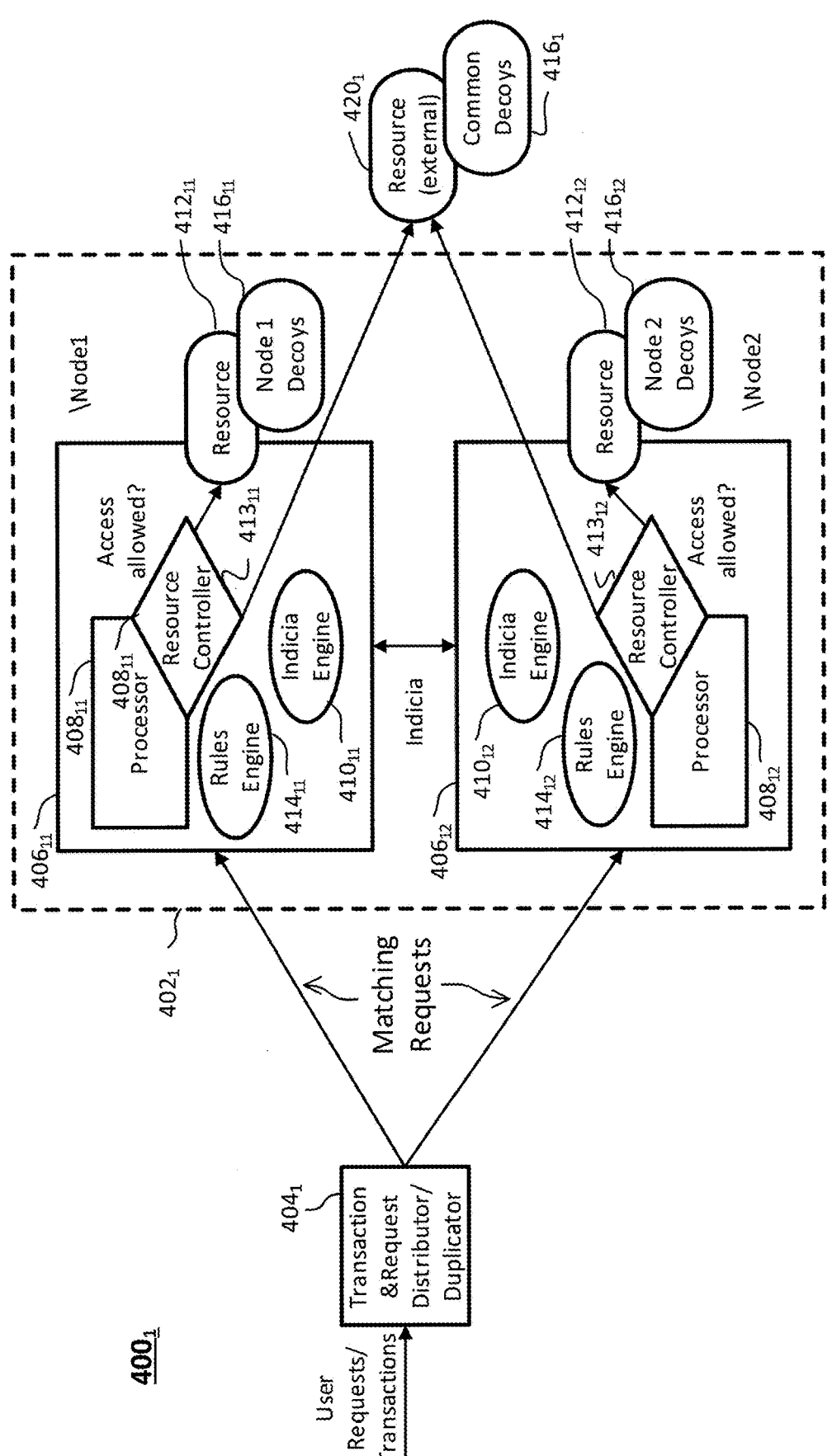
Figure 4A: Endpoint-Protected Validation Architecture System Components

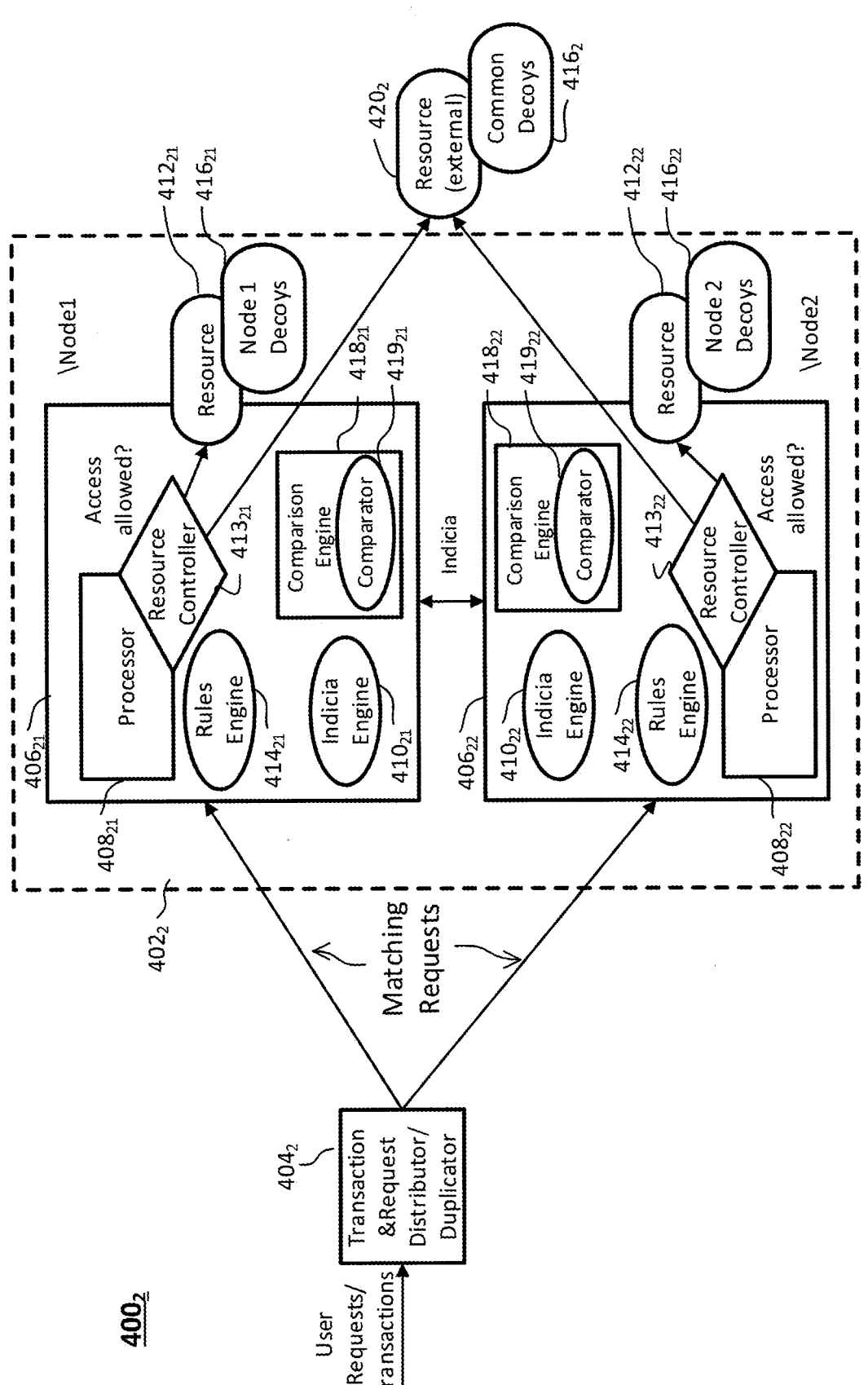
Figure 4B: Endpoint-Protected Validation Architecture System Components

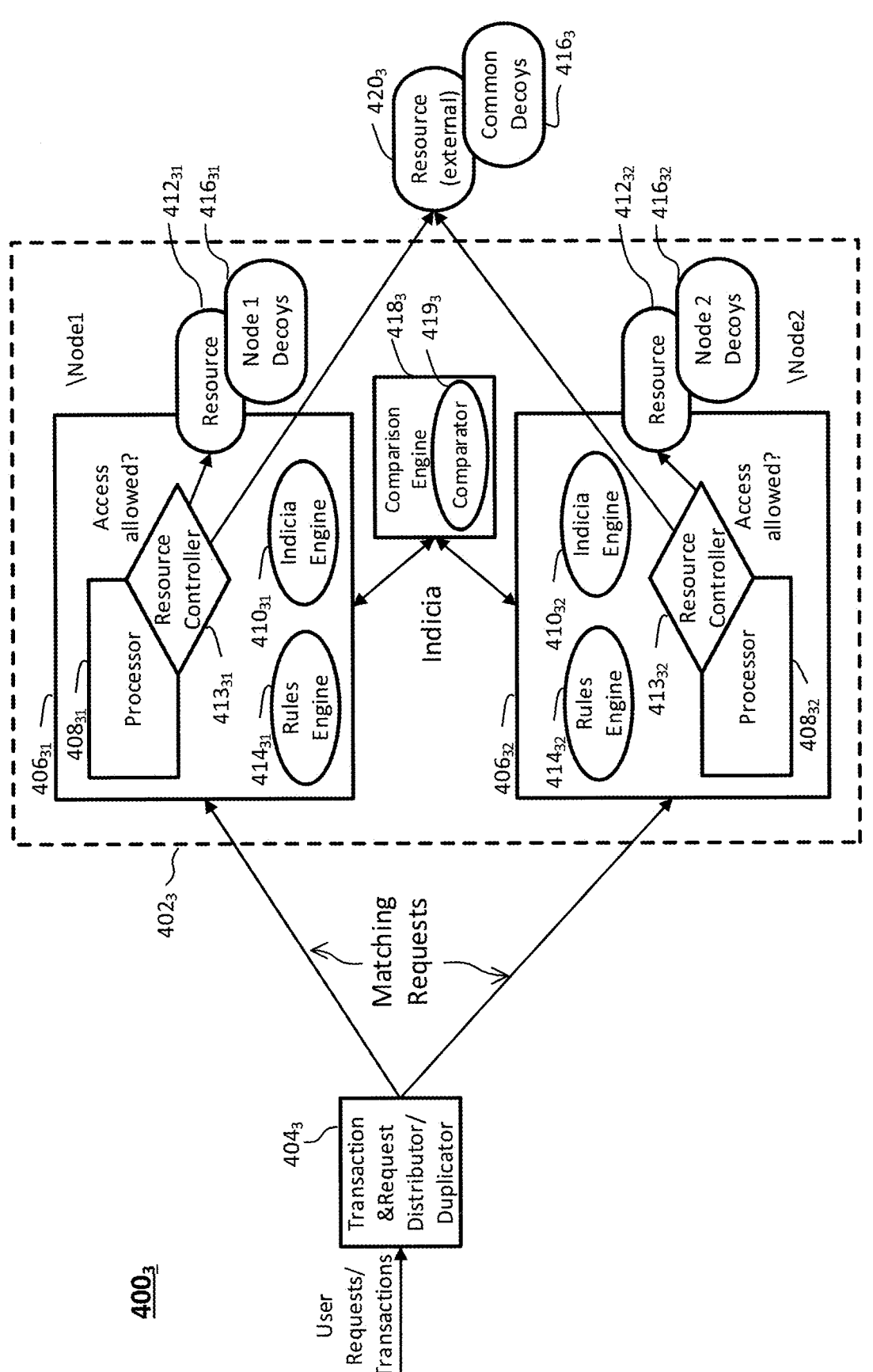
Figure 4C: Endpoint-Protected Validation Architecture System Components

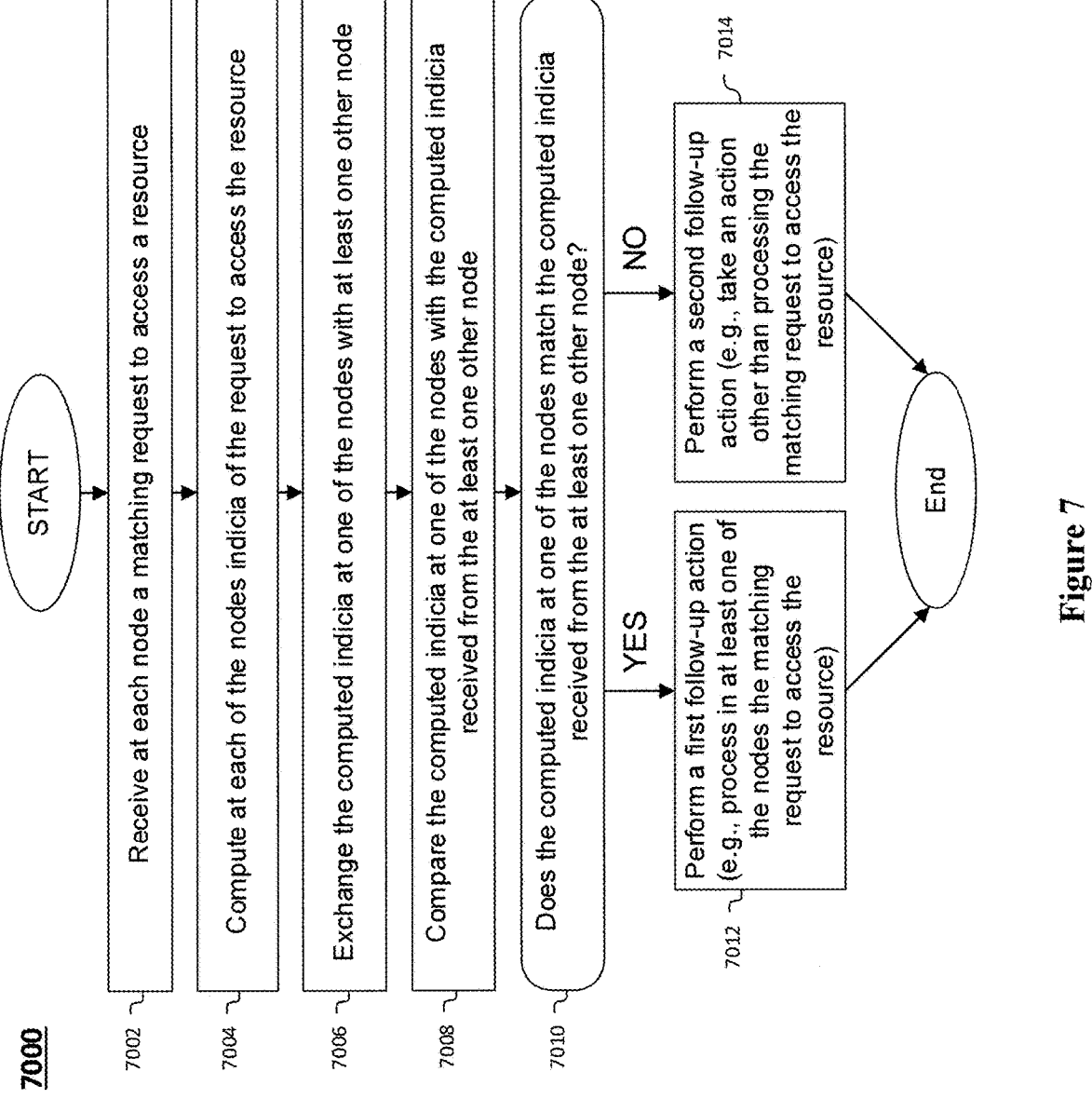

7000

START

7002 — Receive at each node a matching request to access a resource

7004 — Compute at each of the nodes indicia of the request to access the resource 7006 — Exchange the computed indicia at one of the nodes with at least one other node 7008 — Compare the computed indicia at one of the nodes with the computed indicia received from the at least one other node 7010 — Does the computed indicia at one of the nodes match the computed indicia received from the at least one other node?

YES

NO

7012 — Perform a first follow-up action (e.g., process in at least one of the nodes the matching request to access the resource)

7014 — Perform a second follow-up action (e.g., take an action other than processing the matching request to access the resource)

End

Figure 7

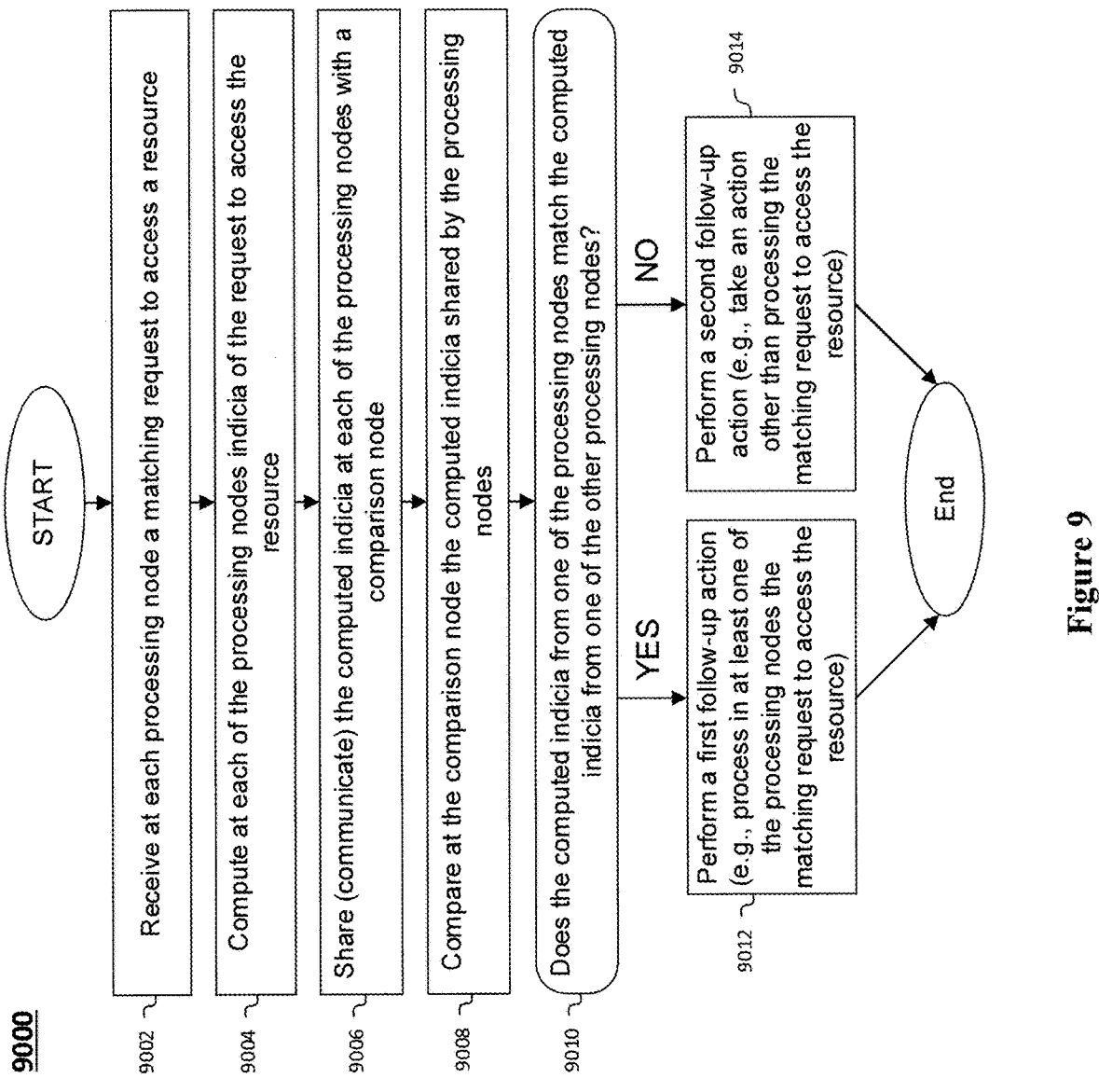

9000

9002 — Receive at each processing node a matching request to access a resource

9004 — Compute at each of the processing nodes indicia of the request to access the resource 9006 — Share (communicate) the computed indicia at each of the processing nodes with a comparison node 9008 — Compare at the comparison node the computed indicia shared by the processing nodes 9010 — Does the computed indicia from one of the processing nodes match the computed indicia from one of the other processing nodes?

YES

9012 — Perform a first follow-up action (e.g., process in at least one of the processing nodes the matching request to access the resource)

NO

9014 — Perform a second follow-up action (e.g., take an action other than processing the matching request to access the resource)

Figure 9

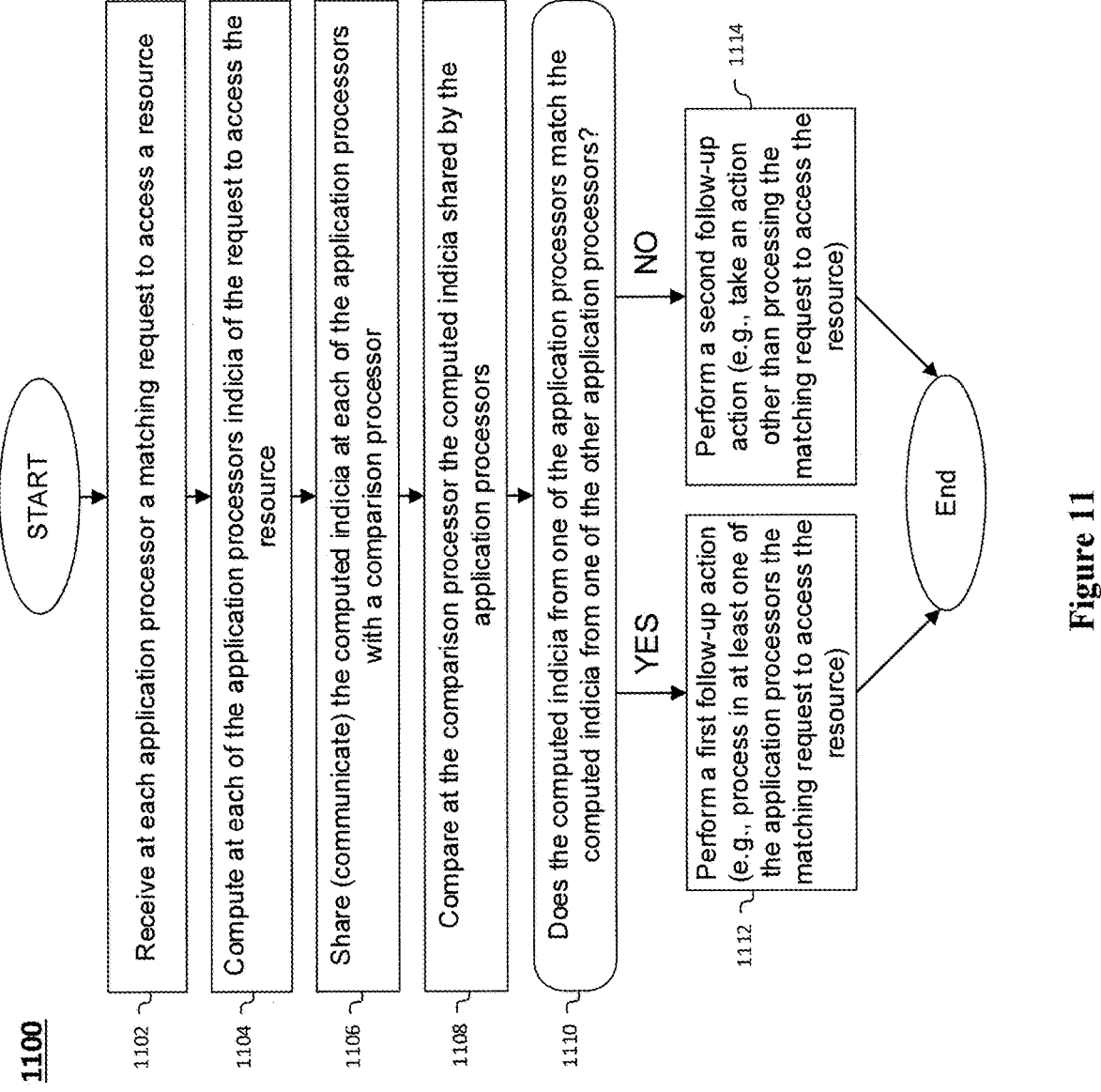

1100

1102 — Receive at each application processor a matching request to access a resource 1104 — Compute at each of the application processors indicia of the request to access the resource 1106 — Share (communicate) the computed indicia at each of the application processors with a comparison processor 1108 — Compare at the comparison processor the computed indicia shared by the application processors 1110 — Does the computed indicia from one of the application processors match the computed indicia from one of the other application processors?

YES

1112 — Perform a first follow-up action (e.g., process in at least one of the application processors the matching request to access the resource)

NO

1114 — Perform a second follow-up action (e.g., take an action other than processing the matching request to access the resource)

End

Figure 11

METHOD AND COMPUTER PROGRAM PRODUCT FOR DETECTING AND PREVENTING SUCCESSFUL ATTACKS AT ENDPOINTS IN A VALIDATION ARCHITECTURE SYSTEM USING COMPARISON OF INDICIA OF A REQUEST TO BE PERFORMED AT MULTIPLE NODES

CROSS-REFERENCE TO RELATED APPLICATIONS

This application is a continuation of U.S. Non-Provisional patent application Ser. No. 18/961,285 filed Nov. 26, 2024, which is incorporated by reference herein.

BACKGROUND OF THE INVENTION

Certain terms used in the "Background of the Invention" are defined in the "Definitions" section.

1.1 Database Integrity and Reliability

It is imperative that the integrity and reliability of important data residing in a database system be protected from unauthorized or unintended changes and disclosure. Database integrity issues could be introduced for a variety of reasons, for example, due to user error, ransomware and other malicious activity, hardware failures, "bit rot," and many other sources. The number of nodes in a database system is related to the effort needed to ensure the data integrity of the system's database. Standalone database systems with a single copy of the database and distributed database systems containing duplicative copies of the database each face different challenges for ensuring data integrity.

1.1.1 Standalone Database Systems

Non-distributed, standalone database systems make use of multiple methods to ensure database integrity. At the hardware level, error correcting memory, self-checking CPUs, disk and memory checksums, and block hashes, among other methods, are utilized to protect systems from hardware faults and bit rot.

At the application level, access control lists, firewalls, multi-factor authentication, virus and ED R scans, VPNs, and many other methods reduce the attack surface and exposure window to hackers and other unauthorized individuals from gaining access to a system.

1.1.2 Distributed Database Systems

In addition to the non-distributed system protection methods described above, additional freedom from database integrity issues may be ensured by comparing replicated or duplicated copies of a database in a distributed database system to make sure that they match. For example, the SOLV and Compare products from Gravic, Inc., USA take a copy or representation of some (or all) of the data in one of the databases, and send it to a daemon that reads a similar data set from the other database, comparing each field or column of every record or row in the copy to make sure they match. Using SOLV and/or Compare, extra data, missing data, or data in both databases that has divergent data subsets (e.g., a field or column in a record or row does not match), can be identified and resolved. Comparing two databases is usually accomplished in a periodic fashion, perhaps every evening after the on-line processing is completed. This means that the data divergence between the two data sets being compared can last for quite sometime, at least until the compare is run and any mismatches it finds are remediated.

1.1.3 Validation Architecture Systems

Prior art Validation Architecture (VA) systems ensure high database integrity for changes made in real-time to a distributed database system. An example is shown in FIG. 1, and described further in U.S. Pat. No. 9,734,190 (Holenstein et al.), U.S. Pat. No. 9,922,074 (Hoffmann et al.), U.S. Pat. No. 10,467,223 (Holenstein et al.), U.S. Pat. No. 11,599,528 (Holenstein et al.), U.S. Pat. No. 11,768,822 (Holenstein et al.) and U.S. Pat. No. 11,782,907 (Holenstein et al.), which incorporates two or more nodes. With this type of architecture system, each node is processing the same user request/transaction and accomplishes dual redundant processing. A Transaction Distributor sends the request to process a transaction to two nodes (L and L' in FIG. 1). Each node calculates indicia of some sort representing the result of its current real-time processing. For instance, indicia could be calculated using a unique hash function on the transactional changes made by the system to its database.

The indicia calculated by the two nodes are exchanged and compared by each node. If they match, the transaction is committed/accepted. If they don't match, the transaction is aborted (or in some embodiments only an alert or error message are issued, or one or more nodes are shutdown, or other remediation action is taken).

The November 2021 issue of "The Connection" Journal describes Level 0, Level 1 and Level 2 Validation Architectures in an article entitled "New Data Integrity Architectures for Mission Critical Systems." Level 0 Offline Transaction Validation occurs periodically using database compare operations after potentially many transactions have been processed. Level 1 Asynchronous Transaction Validation occurs on-line when the transaction being validated has already committed (completed). The validation occurs after the computation and exchange of the indicia of the transaction outcome. Level 2 Synchronous Transaction Validation involves the Validation Architecture system software joining the transaction as a voting member. Similar to Level 1, the indicia are calculated and exchanged. However, with Level 2 these steps occur before the transaction is committed, so if the indicia exchanged do not match, the transaction can be aborted before the damage is done to the database, thereby preventing data corruption.

The architecture shown in FIG. 1 is a Dual Server Reliability (DSR) configuration. A Triple Server Reliability (TSR) configuration is shown in FIG. 2. All nodes process the same transaction/user request, and their indicia are compared. If all indicia match, the transaction is committed (Level 2 VA) and all nodes of the VA system will produce the same output response. If only indicia of two nodes match, the transaction is committed on those two nodes; and the third node can be taken out of service or have corrective action taken. An error indication can be posted for manual resolution of the problem, if necessary.

Extended Validation Architecture (EVA) systems are a form of pre-transaction Validation Architecture configuration that are described further in U.S. Pat. No. 12,118,116 (Holenstein et al.). E V A pre-transaction VA systems, also known as Level 3 VA systems, are needed to deal with situations where system resources are being used and not logged or audited in a way that the Level 0, 1, and 2 Validation Architecture systems require. EV A systems can control access to the system resources before they are utilized in an undesirable way. For example, EVA systems can prevent a large class of attacks where the objective is simply to utilize system resources after gaining access to a node of a victim's system including the following:

1. Ransomware which primarily steals information,
2. Use of non-audited (logged) OS operations like opens and reads,
3. Unauthorized use of programs and applications on the nodes of the system, and
4. Unauthorized use of resources such as network ports and packets or inter-process messages.

1.2 What is Needed

Database integrity issues may arise from many causes. In particular, ransomware, malware, and related hacking tools exist which may modify and encrypt the contents of a database or file system. Attackers often demand a ransom payment, generally made in cryptocurrency, for the victim to regain access to their data. The disruption may result in a significant business outage, lost profits, unhappy customers, bad publicity, a declining stock price, and regulatory scrutiny.

A benefit of Levels 0, 1, 2, and 3 Validation Architectures for distributed database system is that they can detect and often prevent in real-time, or near real-time, all single-node corruption, and many multiple-node types of corruption, such as hardware/software failures, malware, and corrupt system operators from successful attacks on the processing nodes of a multi-node system. Further, VA systems can prevent the propagation of data integrity and reliability issues from cascading and destroying the soundness of the entire database or subsequent down-stream processing.

However, existing Validation Architecture systems are unable to detect, for example, a corrupt user or a hacker with stolen credentials from successfully accessing the system at a user or application endpoint that is feeding transactions into a Transaction Distributor. For example, a ransomware hacker at a VPN'ed PC might send in bulk transaction requests using stolen credentials via a Transaction Distributor to encrypt the database. Or, a corrupt database operator might attempt to transfer money from a victim's account or steal account info like PIN codes. Additionally, an attacker may exploit a bug, misconfiguration, or vulnerability in an authenticated endpoint application such as a web interface to submit unauthorized changes or read sensitive data which would not normally be accessible.

What is needed are systems and methods that are able to protect Level 0, 1, 2, and 3 Validation Architecture systems from causes acting at the endpoints affecting data integrity, reliability, and privacy. Endpoint-protected VA systems are needed to detect and defeat corruption and data exfiltration from sources such as hackers, bad actors, hardware misconfigurations, and other sources.

BRIEF SUMMARY OF THE INVENTION

Actions are performed on data in databases of a multi-node system. Each node includes an indicia engine and each node has access to a respectively associated database. Each of the databases has a first subset of data that match each other and which are intended to be kept in synchronization with each other. At least one of the databases has a second subset of data that does not match a subset of data in at least one of the other databases and which is not kept in synchronization with the at least one of the other databases. In operation, each node receives a matching request to perform an action on data in the database associated with each node. The indicia engine at each node computes indicia of results of the action performed on data in the database associated with each node. The indicia computed at each node is sent to a comparator and the comparator outputs a result of a comparison of the indicia. A first follow-up action is performed when the result of the comparison shows a match. The match indicates that the action was performed only on the first subset of data in the database associated with each node that match each other and which are intended to be kept in synchronization with each other. A second follow-up action is performed when the result of the comparison shows a mismatch. The mismatch indicates that the action was performed at least in part on the second subset of data in the database associated with one of the nodes that does not match a subset of data in at least one of the other databases and which is not kept in synchronization with the at least one of the other databases.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 1 shows a prior art Dual Server Reliability (DSR) Validation architecture.

FIG. 2 shows a prior art Triple Server Reliability (TSR) Validation architecture.

FIG. 3 shows a Validation Architecture Application Framework for a two node Validation Architecture system.

FIGS. 4A-4C illustrate three different embodiments of Endpoint-protected Validation Architecture systems having multi-nodes.

FIG. 7 is a flowchart in accordance with one preferred embodiment of the present invention that relates to the apparatus of FIG. 6.

FIG. 9 is a flowchart in accordance with one preferred embodiment of the present invention that relates to the apparatus of FIG. 8.

FIG. 11 is a flowchart in accordance with one preferred embodiment of the present invention that relates to the apparatus of FIG. 10.

DETAILED DESCRIPTION OF THE INVENTION

Figure 5:
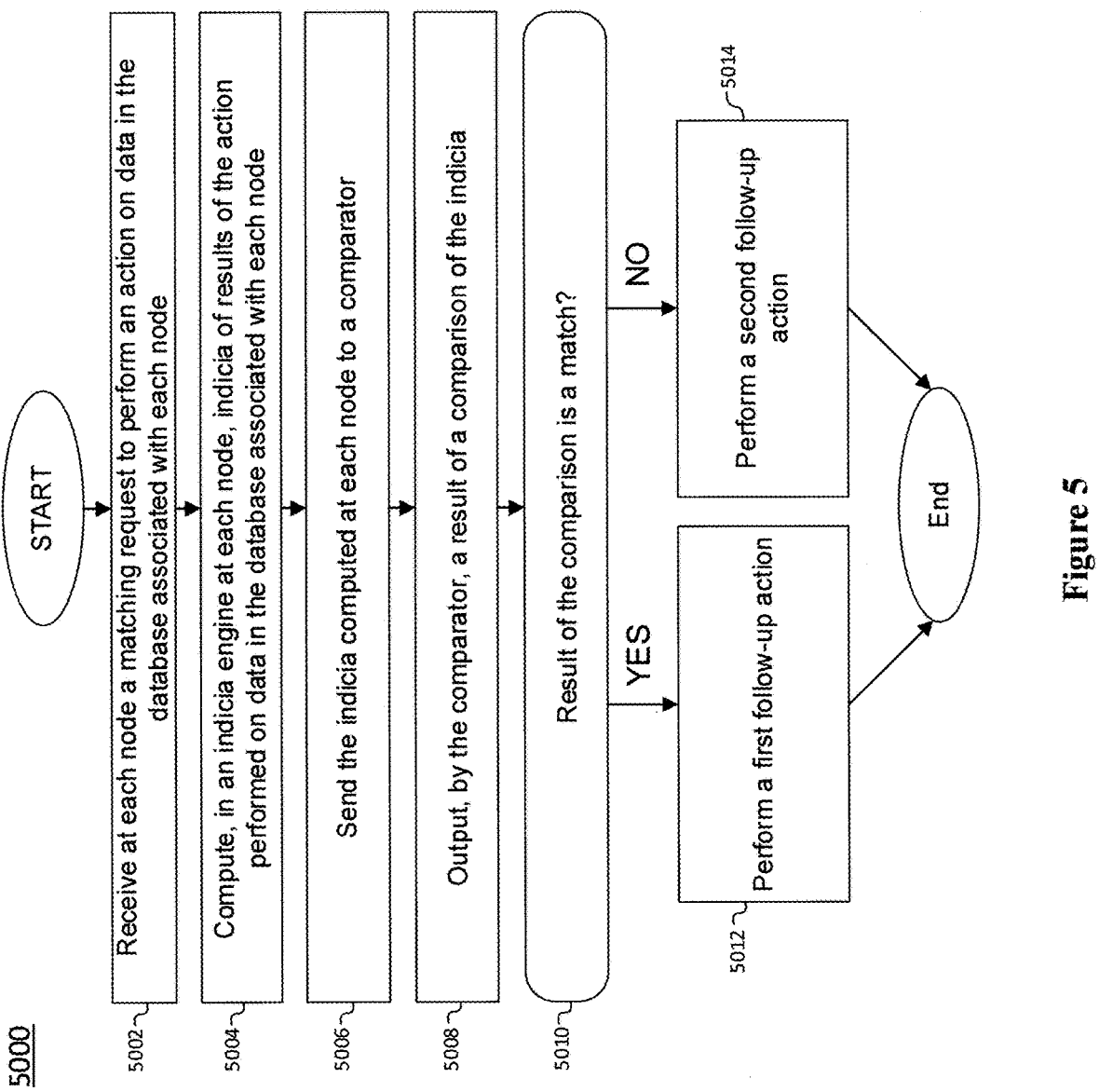
FIG. 5 is a flowchart in accordance with one preferred embodiment of the present invention that relates to the apparatus of FIGS. 4A-4C.

Certain terminology is used herein for convenience only and is not to betaken as a limitation on the present invention.

The words "a" and "an", as used in the claims and in the corresponding portions of the specification, mean "at least one."

Definitions

The following definitions describe the use of certain terms in this specification and are provided to promote understanding of the present invention. They are hierarchically ordered in that each definition builds on previous definitions.

System—A set of one or more nodes that work together to deliver services.

Node—A device, such as a computer, that can work together, e.g., over a network, with one or more other nodes to make up a system.

Change Log (also, interchangeably referred to herein as an "audit trail")—A record of changes made to a database. It usually includes a before image (a copy of the original value of the data that was changed) and an after image (a copy of the final value that the data was changed to be). For example, for an insert change, the before value is null and the after value contains the inserted data. For an update change, the before value is the original data value, and the after value is the final data value. For a delete change, the before value is the original data value, and the after value is null. A change log may only include a record of changes made to a database, but may also include information regarding the sequence of actions that occurred, the transaction ID and timestamp for the operations recorded in the change log, and the one or more process IDs that made the changes. A change log/audit trail may be extended herein by recording entries that otherwise would not have been recorded normally by the operating system, transaction monitoring facility, journaling facility, or other subsystem maintaining or writing to the audit log. For example, an intercept library, application, or user exit might additionally log all user/system requests, attempts to open a file, or read records from a specific resource, even if they would not be traditionally considered changes subject to audit logging. These extended log entries may be structured and treated as audited transactions and inserted either before or after the resource access is allowed or denied.

Transaction—a transaction is the result of a specific type of request or requests that the application processes to provide a service. The transaction groups the various services needed to satisfy the request into a logical set of functions, operations, and/or processing to complete or satisfy the request (e.g., one or more data manipulation language (DML) or data definition language (DDL) operations). The transaction typically has a begin point (e.g., BEGIN step) and an end point (e.g., END step which is either a COMMIT or an ABORT). In most common commercial application environments, the transaction either will be fully implemented, or all effects of it will be removed should the transaction fail or not be able to be completed for any reason.

Audited Transaction—A delimited set of database operations (inserts, updates, deletes, reads, create tables, and/or purge tables, etc.) that are typically logged or journaled and either are all made (e.g., committed) or none are made (e.g., aborted/rolled back). An audited transaction may guarantee to leave the database in a consistent state, and its results are typically guaranteed to survive system failures.

Unaudited Transaction—A database change or group of changes that is not audited. It has no explicit begin or end delimiter, though there may be logical boundaries. An unaudited transaction is not guaranteed to leave the database in a consistent state, and its results are typically not guaranteed to survive system failures.

ACID Properties—Audited transactions generally maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed.

Operating System—A software facility that manages computer hardware resources and provides common services for application processes. Services include time functions, reading and writing interprocess messages, and database manipulation.

End Users (also "Users")—People, systems, devices, applications, or any other entity that can influence an application or can request or use the services that it provides.

Indicia/indicium—A representation, which is often distinguishing, the details of which can vary depending on use case. The indicia may include or be generated based on (i) the changes that an application is going to make to a resource (typically, for databases, values provided in the transaction request), (ii) the results of the changes that were made, but perhaps not committed yet, to the resource (for databases, typically the database transaction "after" values), (iii) the details of a request to access a resource, (iv) the intended outcome of a request to access a resource, or (v) variations or combinations of these elements. For instance, an indicium may be a unique hash or checksum of the changes/request details, or it might be the complete set of changes/request details. In some cases, multiple indicium (indicia) are computed, exchanged, and compared in the Validation Architecture configured for each request. Indicia and Indicium are used interchangeably herein and do not necessarily indicate the number of indicium involved in the applicable case. Indicia are usually based on a Hash value, such as CRC, SHA, MD5 or similar algorithm. These are calculated from sets of data, and they may be used to identify the data with fewer bits/bytes than in the original set of data. For example, a 128-bit hash value for a 100-byte string can be used to generate a 16-byte, or smaller if truncated, value which represents fairly uniquely that 100-byte string. Another 100-byte string with even one different byte will result in the generation of a completely different hash value which will almost certainly not match the hash value for the first 100-byte string. If the hash value algorithm does in fact produce the same hash value for two different input strings, then the strings themselves can always be compared if complete certainty is needed that the sets of data match. In some cases, the indicia may be the full original data, or a subset thereof.

Validation Architecture (VA)—A redundant system architecture in which two or more computing nodes are actively processing the same transaction/request. In prior art systems, each node calculates indicia representing the changes that it will make, or made, to its database. If the two indicia match, the transaction is committed (if not already committed). Otherwise, the transaction is aborted and an error is reported or in some embodiments only an alert or error message is issued, or one or more systems are shutdown, or other remediation action is taken such as:

(i) issuing a database rollback on one of the systems, (ii) executing self-diagnostics on one of the systems, (iii) ignoring the issue, for example, if it will be repaired in a subsequent transaction, (iv) taking one of the systems or its application offline, (v) aborting the transaction executing on a subset of the systems (if more than two systems are in use), and (vi) resynchronizing the database at one or more systems.

Validation Architecture systems that compute the indicia for the transaction being validated after the Commit happens on the nodes are called a Level 1 VA, and if before the Commit happens (after joining the transaction in some cases as a voting member) are called a Level 2 VA. An Extended VA (EVA) configuration of may be considered a Level 3 VA, in part, because the request is validated prior to any action against the target resources, such as a database. Honeypots and Honey nets—A honeypot is typically a system that is set up to appear to be a legitimate server on a user's network, though it could be any sort of digital asset, such as a printer or SAN array, that is set up to appear to be a valid/legitimate resource. A honey net is a group of honeypots that simulate a production network of systems. Users trying to access resources contained in a honeypot are presumed to be unauthorized and perhaps hackers. Thereby, honeypots serve as decoys so that hackers waste their time and are detected before they can hack into actual production systems to steal or destroy data. Additionally, details on how attackers operate, capabilities, and degree of sophistication may be gleaned from observations of their actions.

Validation Architecture Application Framework

A common structure for implementing a Validation Architecture is called a Validation Architecture Application Framework. FIG. 3 shows the Framework containing a two node Validation Architecture system consisting of the following components:

A. Transaction Distributor/Duplicator (TD)—takes an application or end user's request or transaction and sends it to the nodes of the VA system (here \Node1 and \Node2) that are participating in the validation architecture. TD's may be synchronous (TD/s) and able to handle only one user request at a time or asynchronous/ multi-threaded (TD/a) and able to handle multiple, overlapping user requests at the same time. The VA system may have many TD/a and TD/s distributors simultaneously feeding it overlapping user transactions. The same request or transaction is sent to each node of the VA system as a matching request. Mapping or other changes may be applied as needed to deal with resource and processing node differences.

B. The Validation Architecture system—the nodes of the Validation Architecture system execute redundant copies of the user application, often on identically provisioned and configured hardware and software. Typically located at each node for Level 1, 2, and 3 VA's is a module called the Validation Architecture Module (VAM) which accomplishes the indicia creation from the outcome of the user transactions, and exchanges and compares it in accordance with the prior art methods. The preferred embodiments of the present invention may optionally operate alongside of the VAM or as extensions to or part of the VAM.

C. Transaction Response Combiner (TRC)—In the simplest characterization, the TRC accepts the redundant responses from each node of the Validation Architecture system and generates a single final response for the VA system. There may be specialized TRC's receiving responses where the TRC's are specialized for the type of responses received from the nodes of the VA system.

Application processing is independently and redundantly accomplished on the various nodes of prior art Validation Architecture systems and then validated by the prior-art methods discussed in the Background and above sections. User requests to such prior art systems utilize system resources where the use of the resources (e.g., a database) is being logged, audited, or monitored in a way that the existing Validation Architecture systems are able to validate the results of transaction outcomes.

Traditional resource access controls, such as access control lists (ACLs), and firewalls, plus tools like anti-virus and Endpoint Detection and Response (EDR) partially protect individual nodes against problems such as attackers and malware. Validation Architecture systems can make use of these same single node capabilities. However, they derive enhanced security beyond those single node capabilities by requiring an attacker to break into and attack multiple nodes of the VA system simultaneously to avoid detection.

Level 3 Validation Architecture (EVA) systems are able to detect/handle attacks from some forms of ransomware, malware, hacking tools, and other bad-actor threats which do not modify the contents of an audited database, file system, memory, or other resource. The lack of auditing/ logging of the read only access means the attack is not detectable in the same way, and thus are not caught and/or prevented by existing Level 0, 1, and 2 Validation Architecture systems. As an example, the bad-actors may stealthily steal identification and financial data like IDs and credit card numbers, passwords, pins, and private keys to use or sell. They may also exfiltrate copies of personal or business private information, and threaten to publicly publish it to embarrass or cause a regulatory breach, thereby causing financial or reputational harm in order to seek a ransom payment, often made in cryptocurrency. Additional threats exist from the bad-actors utilizing or stealing system resources such as CPU cycles for cryptocurrency mining, or public address systems to cause a panic. Additionally, prior-art Level 3 VA systems are able to protect:

1. Audited databases which are not being actively modified by an attacker, as is the case in certain kinds of ransomware which primarily steals information.

2. Non-audited OS operations like opens and reads, e.g., to provide additional access security and monitoring, 3. Programs and applications used on the nodes of the system, e.g., to validate the use of/validity/authenticity/ authorization of user requests, 4. Network traffic/interprocess messages (IPCs), e.g., to validate the use of/validity/authenticity/authorization of network ports and packets or inter-process messages—but in a nondeterministic way that does not suffer from the limitations of prior art such as lockstep/ logical synchronization unit (LSU).

5. Resources which are not audited, journaled, or logged, e.g., by using a SQL query tool to simply read patient data from a healthcare database. In this case, the unauthorized access could go on for months prior to discovery resulting in a large exfiltration of data.

6. Resources which are logged, e.g., as being part of an ACID transaction, but where the damage or theft can be accomplished while the transaction is in progress, e.g., by starting a transaction on an audited file containing confidential data such as passwords, reading the contents of the confidential file, then aborting the transaction or allowing it to time out. Thus, the database is not permanently changed, but the data has been seen or used by an attacker.

7. Resources from being used wastefully or destructively, or in a way which could deceive the public such as:

a. Wasting paper and ink printing unneeded reports.

b. Deceiving people by producing bad checks or other secure documents.

c. Stealing CPU cycles, wasting electricity, and HVAC/ cooling.

d. Public alert systems sending out false fire/tsunami/
earthquake/invasion/other messages.
8. Data from being altered while it is in-flight. For
example, detecting alteration of a data value that is
going to be printed, displayed or transmitted, such as an
amount or an account number on a check.
9. Hardware from faults, software from bugs, memory
and CPU impacts from cosmic rays, and other envi-
ronmental factors, plus operator malfeasance or user
error, that might affect the contents of requests and the
operation of the resource access controls. The EVA can
validate the data both on entry and exit from each and
every or just select processes, drivers, and similar
functions.

Endpoint-Protected Validation Architecture Systems

If an attacker is able to steal user credentials, exploit an
authenticated or authorized endpoint application, or gain
access to a user's endpoint device such as a PC or tablet,
corrupt user requests could be submitted and then dutifully
duplicated by the Transaction Distributor. Preferred embodi-
ments of the present invention protect the endpoints feeding
user requests into a VA system by extending the concept of
honeypots and honey nets by the use of decoy data, or in
other embodiments by the use of decoy resources, inserted
into the production databases or system configuration at the
nodes of the VA system which is non-duplicated and unique
to each node of the VA system. This decoy data subset is not
kept in sync with the other nodes of the VA system as is the
non-decoy, typically production data. A duplicated user
request arriving at two or more nodes of the VA system may
access the decoy data, and because it is not duplicated or not
the same at the various VA system nodes processing the user
request, it will be detected by the VA system indicia gen-
eration and exchange methods as non-matching. A Iso, even
the operators of the VA system may not know, nor be able
to find out, which database rows or columns contain decoy
data elements. Thus, endpoint-protected VA Systems extend
protection for a VA system out to the endpoints feeding user
requests/transactions into the multi-node system via the
Transaction Distributor.

Elements of Endpoint-Protected VA Systems

FIGS. 4A-4C illustrate preferred embodiments of an
Endpoint-protected VA system having multi-nodes (two in
this case), with each node including (i) a processor such as
a CPU, FPGA, or ASIC, and (ii) an indicia engine running
in the processor or somewhere on the node.

Each node has access to a resource(s) that is accessible to
the processor. The resource may be a database, shared
memory, cache memory, a display, speaker, TC P/IP net-
work, network port/IP address, or network device, or other
device either on or external to the node (e.g., at another
node). Situated among the resource(s) are decoy data, decoy
files, decoy tables, decoy devices, or other decoy objects as
further described below, each of which are also interchange-
ably referred to herein as "decoys" or "decoy resources."

In some embodiments, a Resource Controller (RC) com-
ponent controls access to the resource and is a part of the
processor, running on the node, and/or otherwise is in the
path between the processor and the resource. The RC could
also be at, on, or part of the resource itself. If there are
multiple copies of the resource, each with its own RC, the
exchange and comparison of the indicia can proceed nor-
mally. If, however, there is only one resource being used, or
otherwise only one RC in use, that single RC can receive
multiple requests, and provide or use multiple sets of indicia
for those requests which are used to determine whether to
process the requests, redirect them, or take some other action. In some embodiments, the RC could also be a
function of the node itself as a whole, or operating system,
BIOS, or other software running on the node.

The resource may be accessible to the processor, via the
RC or directly, or by methods such as the following:
A. Hardwiring to the processor,
B. Via a network, e.g., WiFi, PCIe bus, TCP/IP or Expand,
C. Wireless link, e.g., optical or microwave relay,
D. Via other software or hardware resources, or other
types of interconnection methods.

Additionally, the resource may be shared between the
nodes, especially if it is an external resource. A Iso, access
to the resource may be controlled by a separate resource
controller component which could be part of the processor,
running on the node, and/or otherwise in the path between
the processor and the resource. In the case of shared
resources, the decoys may be implemented by differential
attributes such as metadata (e.g., permissions), access paths,
or selection filters between the nodes of the endpoint-
protected validation architecture system and the resource
such that each node has different access to, or interacts
differently, with the resource and related decoys.

In some cases, the processor will execute software such as
a program or application, microcode, or have configurable or
hard-wired logic elements.

FIGS. 4A-4C illustrate apparatuses that show the hard-
ware/software architecture for implementing preferred
embodiments of the present invention. FIG. 4A shows
apparatus $400_1$, FIG. 4B shows apparatus $400_2$, and FIG. 4C
shows apparatus $400_3$.

Referring to FIG. 4A, access is controlled to resources in
a multi-node system 4021, also interchangeably referred to
herein as an "Endpoint-Protected Validation Architecture
(EPVA) system $402_1$" or "EPVA system $402_1$." The appa-
ratus $400_1$ includes Transaction & Request Distributor/Du-
plicator $404_1$, interchangeably referred to herein as "Trans-
action Distributor $404_1$," and the EVPA system $402_1$. The
EVPA system $402_1$ includes multiple nodes 406. For ease of
illustration, FIG. 4A only shows two nodes, labeled as
EVPA Node1 $406_{11}$ and EPVA Node2 $406_{12}$. Thus, there
may be additional nodes ($406_{11}$, $406_{12}$, . . . $406_{1n}$). Each
node 406 includes a processor 408, labeled as processor
$408_{11}$ and processor $408_{22}$, and an indicia engine 410,
labeled as indicia engine $410_{11}$ and indicia engine $410_{12}$. As
further described below, the indicia engine $410_{11}$ compares
directly, or in a Comparator (not shown), its computed
indicia with the indicia for the matching requests, which
may be received from other nodes via the indicia exchange
shown in FIG. 4A. The indicia engine $410_{12}$ may also
perform this same function.

Each node 406 further includes a rules engine 414, labeled
as rules engine $414_{11}$ and rules engine $414_{12}$. The rules
engine 414 is described in further detail below.

Each node 406 has access to a resource 412, labeled as
resource $412_{11}$ and resource $412_{12}$. that is accessible to the
processor 408 of its respective node 406. Access to the
resource 412 may occur directly or via an intermediary
resource controller 413 at each respective node, labeled as
resource controller $413_{11}$ and resource controller $413_{12}$. In
an alternative embodiment, the resource 412 may be a
shared resource that is external to the node 406, but still
accessible to the processor 408. The external resource is
labeled as resource 4201. In one preferred embodiment, the
resource 412 is a database. In other preferred embodiments,
the resource 412 is a network port or a hardware device (e.g.,
GPU, memory region, printer). Each node 406 also has
access to respective decoys, labeled as Node1 Decoys $416_{11}$ and Node2 Decoys $416_{12}$. In addition, there are Common Decoys $416_1$ which are accessible by both Node1 $406_{11}$ and Node2 $406_{12}$.

Referring to FIG. 4B, access is controlled to resources in EPVA system $402_2$. The apparatus $400_2$ of FIG. 4B includes the same components as shown in FIG. 4A which are labeled with similar numbers, except that in FIG. 4B, each node $406_21$ and $406_{22}$ includes a comparison engine having a comparator therein, labeled as comparison engine $418_{21}$, comparator $419_{21}$, comparison engine $419_{22}$, and comparator $420_{22}$, whereas the functionality of these components is performed in the indicia engine $410_{11}$ and indicia engine $410_{12}$ in the FIG. 4A embodiment.

Referring to FIG. 4C, access is controlled to resources in EPVA system $402_3$. The apparatus $400_3$ of FIG. 4B includes the same components as shown in FIG. 4A which are labeled with similar numbers, except that in FIG. 4C, the indicia outputted by each of node $406_{31}$ and $406_{32}$ is sent to an external comparison engine having a comparator therein, labeled as comparison engine $418_3$ and comparator $419_3$, whereas the functionality of these components is performed in the indicia engine $410_1$ and indicia engine $410_{12}$ in the FIG. 4A embodiment.

FIG. 5, described below, is a flowchart in accordance with one preferred embodiment of the present invention that relates to all three of the apparatuses of FIGS. 4A-4C.

One preferred embodiment of the present invention provides a method and computer program product for performing an action on data in databases of a multi-node system. Each node includes an indicia engine and each node has access to a respectively associated database. Each of the databases have a first subset of data that match each other and which is kept in synchronization with each other as a result of the matching requests being redundantly processed at nodes participating in the validation architecture system. At least one of the databases has a second subset of data that does not match a subset of data in at least one of the other databases and which is not kept in synchronization with the at least one of the other databases. H ere, the second subset of data does not match other subsets of data because the second subset of data includes at least some data that is deliberately non-matching with respect to the other subsets of data, in contrast to having inadvertent non-matching data that may be the result of causes that prior art validation methods described in the background section above are able to detect, such as unintentional corruption or hacking into a node. One example of the second subset of data is decoy data, as explained above. Referring to flowchart 5000 in FIG. 5, the method operates as follows:

Step S002: Receive at each node a matching request to perform an action on data in the database associated with each node.

Step S004: Compute, in the indicia engine at each node, indicia of results of the action performed on data in the database associated with each node.

Step S006: Send the indicia computed at each node to a comparator.

Step S008: Output, by the comparator, a result of a comparison of the indicia.

Step S010: Perform either a first follow-up action or a second follow-up action depending upon the result of the comparison.

Step S012: The first follow-up action is performed when the result of the comparison shows a match. The match indicates that the action was performed only on the first subset of data in the database associated with each node that match each other and which are intended to be kept in synchronization with each other.

Step S014: The second follow-up action is performed when the result of the comparison shows a mismatch. The mismatch indicates that the action was performed at least in part on the second subset of data in the database associated with one of the nodes that does not match a subset of data in at least one of the other databases and which is not kept in synchronization with the at least one of the other databases.

In the computer program product embodiment, the computer program product comprises a non-transitory computer readable storage medium tangibly embodying non-transitory computer executable program instructions thereon, that, when executed by one or more processors, cause one or more computing devices to perform the steps of FIG. 5.

In one alternative embodiment, the request to perform an action on data in the database associated with each node is an update request. In this alternative embodiment, the first follow-up action completes (e.g., commits) the results of the update request on data in the database associated with each node, and the second follow-up action reverts (e.g., aborts) the results of the update request on data in the database associated with each node.

In another alternative embodiment, the request to perform an action on data in the database associated with each node is a read request. In this alternative embodiment, the first follow-up action returns the results of the read request performed on data in the database associated with each node, and the second follow-up action does not return the results of the read request performed on data in the database associated with each node.

In another alternative embodiment, the database associated with each node has metadata associated with the data in the database. The metadata includes permissions which are enforced by the database. The metadata for the first subset of data is included in the first subset of data, and the metadata for the second subset of data is included in the second subset of data. One example of this alternative embodiment is when data in rows of two databases are identical but metadata such as permissions or flags may be different. If the metadata is included along with the data in rows when calculating the indicia, then metadata which is not in sync will cause a mismatch in the indicia comparison. Additionally, the indicia calculation may be affected and cause a mismatch in the indicia comparison if the database processes or does not process the rows, or processes them differently due to differing data or metadata, or such as in the case of a shared database, differing differential attributes applied for the connecting nodes based on aspects such as permissions, filters, or access paths.

In another alternative embodiment, the databases each have rows, and the matching request is to perform an action on data in an identified row of the databases associated with each node. The data may be null, not existing, or decoy data.

In another alternative embodiment, the matching request is electronically submitted by a user of the multi-node system who has credentials to submit requests to the multi-node system, and the second follow-up action is revoking or altering the user's credentials to restrict submission of subsequent requests to the multi node system.

In another alternative embodiment, the matching request is electronically submitted by a user of an endpoint application such as a web interface which is using the multi-node system. The user does not have credentials to submit requests to the multi-node system, instead the endpoint application itself is authorized/credentialed to perform limited requests on behalf of any users able to connect to it. A bug or vulnerability could be exploited by an attacker, or accidentally triggered by a legitimate user, and cause a mismatch due to the processing of a submitted request interacting or touching a decoy. The second follow-up action could be, for example, revoking the application's credentials or altering the application's behavior to restrict submission of subsequent requests from that user, from all non-credentialed users, or from all users of the endpoint application to the multi node system.

In another alternative embodiment, the comparator is located at one of the nodes and each of the other nodes sends their respective indicia of the results of the action performed on data in the database to the comparator at the one node. Alternatively, the comparator may be located in a comparison engine external to all of the nodes and each of the nodes sends their respective indicia of the results of the action performed on data in the database to the comparison engine.

In another alternative embodiment, at least one of the databases includes a third subset of data which does not match either the first subset of data or the second subset of data, and which is not kept in synchronization with at least one of the other databases. H ere, the second follow-up action is performed when the result of the comparison shows a mismatch, the mismatch indicating that the action was performed at least in part on the third subset of data in the database associated with one of the nodes that does not match a subset of data in at least one of the other databases and which is not kept in synchronization with at least one of the other databases. One use case for this alternative embodiment is that operators at different nodes may install their own sets of decoy data.

Additional embodiments of Endpoint-Protected VA Systems are described below.

1. Multi-Node Embodiment with Exchanging of Computed Indicia

Figure 6:
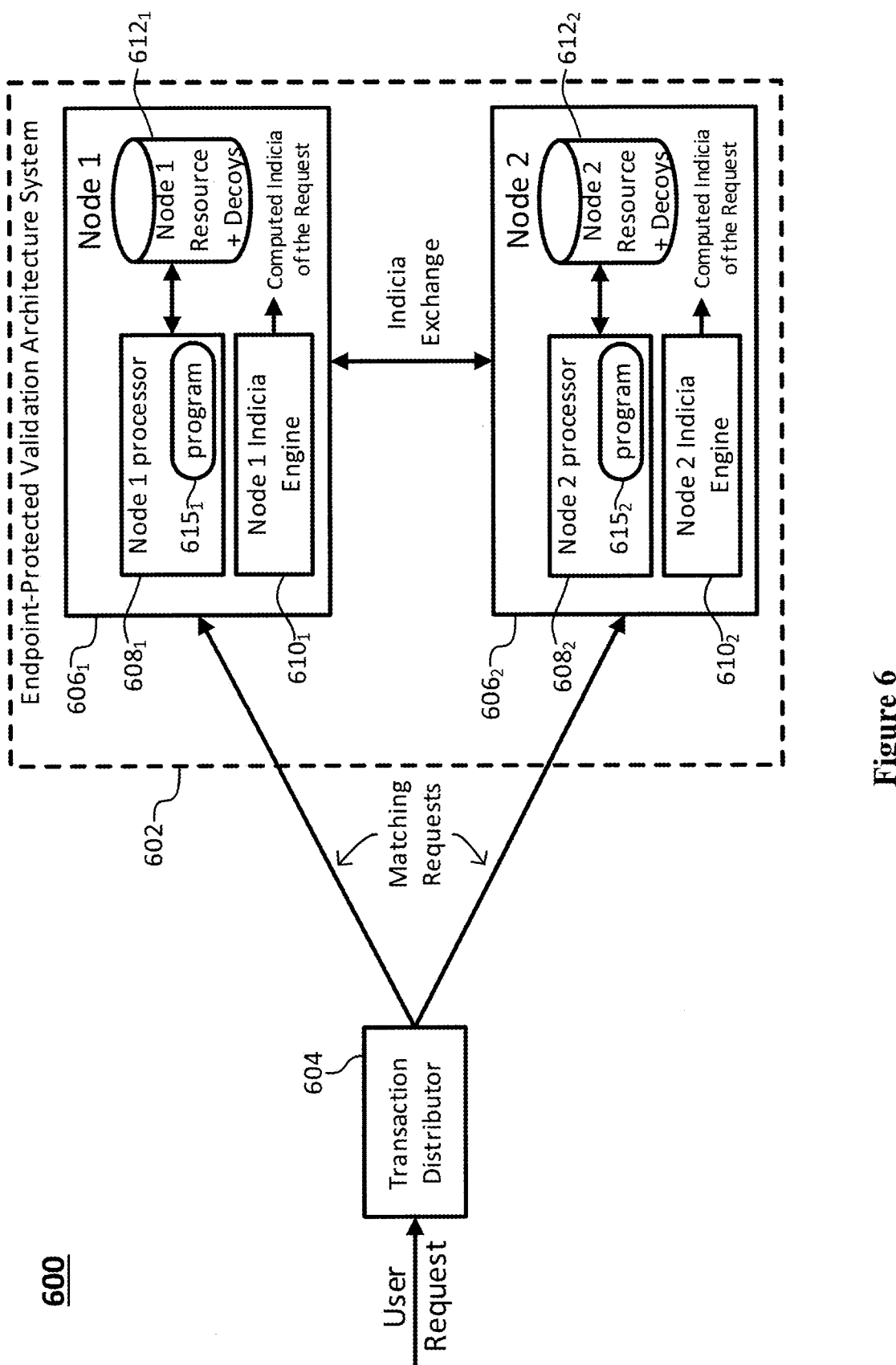
FIG. 6 is an apparatus that shows the hardware/software architecture that implements one preferred embodiment of the present invention.

FIG. 6 is an apparatus 600 that shows the hardware/ software architecture that implements one preferred embodiment of the present invention. FIG. 7 is a flowchart in accordance with one preferred embodiment of the present invention that relates to the apparatus 600 of FIG. 6. Referring to FIG. 6, access is controlled to resources in a multi-node system 602, also interchangeably referred to herein as an "Endpoint-Protected Validation Architecture (EPVA) system 602" or "EPVA system 602." The apparatus 600 includes Transaction Distributor 604 and the EPVA system 602. The EPVA system 602 includes multiple nodes 606. For ease of illustration, FIG. 6 only shows two nodes, labeled as EPVA Node1 $606_1$ and EPVA Node2 $606_2$. Thus, there may be additional nodes ($606_1$, $606_2$, . . . $606_n$). Each node 606 includes a processor 608, and an indicia engine 610. Each node 606 has access to a resource and decoys 612 (Node1 Resource+Decoys $612_1$ and Node2 resource+Decoys $612_2$) that is accessible to the processor 608, labeled in FIG. 6 as processors $608_1$, $608_2$, indicia engines $610_1$, $610_2$, and resource $612_1$, $612_2$. (For simplicity, the "resource+decoys" is referred to herein as "resource.") In an alternative embodiment, the resource 612 may be a shared resource that is external to the node 606, but still accessible to the processor. For simplicity, the resource 612 is shown as being within the node 606. In one preferred embodiment, the resource 612 is a database. In other preferred embodiments, the resource is a network port or a hardware device (e.g., GPU, memory region, printer).

Referring to FIG. 6 and the steps of flowchart 7000 in FIG. 7, the EPVA system 602 operates as follows:

Step 7002: The Transaction Distributor 604 receives a user request to access a resource (here, resource 612) and distributes the same user request (matching requests) to each of the nodes, here, nodes $606_1$, $606_2$. Each of the nodes $606_1$, $606_2$ receive the matching request to access the resource. In one preferred embodiment, the matching request to access resources is received at each node via an intercept library (not shown).

The indicia engines 610 at each of the nodes 606 perform the following functions of steps 7004, 7006, and 7008, described with respect to node $606_1$:

Step 7004: Compute indicia of the request to access the resource $612_1$.

Step 7006: Exchange its computed indicia with at least one other node. H ere, the exchange occurs between nodes $606_1$, $606_2$.

Step 7008: Compare its computed indicia with the computed indicia received from the other node. H ere, the computed indicia from the indicia engine $610_1$ is compared to the computed indicia from the indicia engine $610_2$. This function may be performed by a comparator (not shown) executing in the indicia engine 610.

Step 7010: A determination is made as to whether the computed indicia at one of the nodes (here, node $606_1$) matches the computed indicia received from the at least one other node (here, node $606_2$). When there are only two nodes $606_1$ and $606_2$, a match will require that the computed indicia at each of the nodes $606_1$ and $606_2$ match each other. When there are more than two nodes 606, a match may require that the computed indicia at one of the nodes (here, node $606_1$) matches all of the computed indicia at the other nodes. Alternatively, a voting process may be used with a "majority wins" rule determining if there is a match.

Step 7012: When there is a match, perform a first follow-up action, such as process in at least one of the nodes the matching request to access the resource. In one example, when there is a match (when the result of the comparison indicates that the computed indicia of node $606_1$ matches the computed indicia of node $606_2$), process in the processor $608_1$ of node $606_1$ the matching request to access the resource $612_1$. In one alternative embodiment, the processing occurs at all of the nodes 606 in the multi-node system 602, and each node 606 individually allows for access to the resource 612 at the respective node 606 based on the result of the comparison that occurs at the respective node 606.

Step 7014: When there is no match, perform a second follow-up action, such as taking an action other than processing the matching request to access the resource $612_1$. Examples of potential actions include responding with null data, responding with redacted data, responding with intentionally corrupted data, shutting down one or more of the nodes or databases, or redirecting to another resource.

A similar process may occur in node $606_2$ wherein the indicia engine $610_2$ compares the computed indicia of node $606_1$ (outputted by the indicia engine $610_1$) to the computed indicia of node $606_2$ (outputted from the indicia engine $610_2$). Similarly, if the computed indicia match, the processor $608_2$ of node $606_2$ will process the matching request to access the resource $612_2$. If there is no match, an action may optionally be taken other than processing the matching request to access the resource $612_2$.

In one preferred embodiment, one or more of the nodes further includes a program 614 executing on the processor 608 associated with the respective node 606. H ere, the programs 614 are labeled as $614_1$ and $614_2$ in the respective nodes $606_1$ and $606_2$. For a respective node 606, the access to the resource 612 is controlled by blocking or pausing the execution of the program 614 in the processor 608. That is, when execution of the program 614 is blocked or paused, access to the resource 612 at the node 606 in which the program 614 resides is inhibited. Similarly, for a respective node 606, execution of the program 614 in the processor 608 is unblocked or resumed when the result of the comparison indicates that the computed indicia at the node 606 in which the program 614 resides matches the computed indicia received from at least one other node 606.

In another preferred embodiment, the access to the resource 612 is controlled by preventing the resource 612 from being opened. In this embodiment, the resource 612 at a particular node 606 is opened when the result of the comparison at that node indicates that the computed indicia at the particular node matches the computed indicia received from at least one other node 606.

In the preferred embodiment where the resource 612 is a database, the request to access the resource 612 (database) may not be a part of a transaction request. The request to access the resource 612 (database) may be an open or read request. In the embodiment where the resource 612 is a database, the computed indicia may be a hash of the request to access the resource 612. In the embodiment where the resource 612 is a database, Step 7002 of FIG. 7 (receiving step) may be via a "before trigger" on the database. As is well-known in the art, a before trigger is a special type of database object that is automatically executed before a certain event occurs.

2. Multi-Node Embodiment with Shared Computed Indicia/Shared Resource

Figure 8:
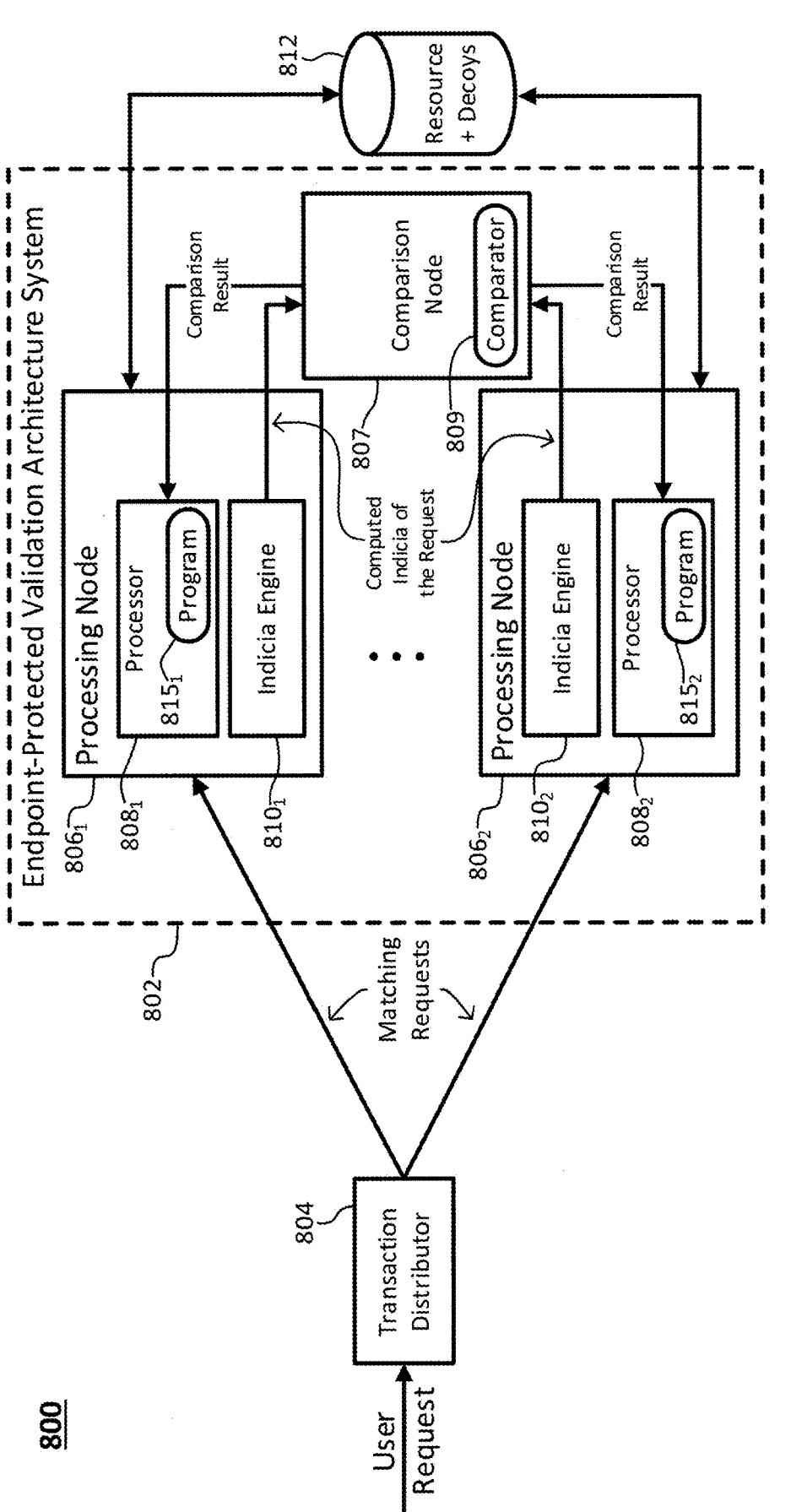
FIG. 8 is an apparatus that shows the hardware/software architecture that implements another preferred embodiment of the present invention.

FIG. 8 is an apparatus 800 that shows the hardware/software architecture that implements one preferred embodiment of the present invention. FIG. 9 is a flowchart in accordance with one preferred embodiment of the present invention that relates to the apparatus 800 of FIG. 8.

Referring to FIG. 8, access is controlled to resources in a multi-node system 802, also interchangeably referred to herein as an "Endpoint-Protected Validation Architecture (EPVA) system 802" or "EPVA system 802." The apparatus 800 includes Transaction Distributor 804 and the EPVA system 802. The EPVA system 802 includes multiple processing nodes 806 and a comparison node 807. For ease of illustration, FIG. 8 only shows two processing nodes 806, labeled as processing node $806_1$ and processing node $806_2$. Thus, there may be additional nodes ($806_1$, $806_2$, ... $806_n$). Each processing node 806 includes a processor 808 and an indicia engine 810., labeled in FIG. 8 as processors 8081, $808_2$ and indicia engines 8101, $810_2$. Each of the processors 808 includes a program 815 that executes on a respective processor 808, labeled in FIG. 8 as programs $815_1$ and $815_2$. The apparatus 800 further includes a resource+decoys 812 which may be shared among the processing nodes 806. (For simplicity, the "resource+decoys" is referred to herein as "resource.") The resource 812 is accessible to each of the processors 808, and, more specifically, to the programs 815 executing on the respective processors 808. In one preferred embodiment, the resource 812 is a database. In other preferred embodiments, the resource is a network port or a hardware device (e.g., GPU, memory region, printer). In one preferred embodiment, the resource 812 may be a shared resource that is external to the EPVA system 802, but still accessible to the processors 808 of the processing nodes 806.

FIG. 8 differs from FIG. 6 in a few different ways. In FIG. 6, outputs of the indicia engines 610 are exchanged between nodes 606, whereas in FIG. 8, outputs of the indicia engines 810 are shared with (communicated to) the comparison node 807 which performs the comparison and communicates the comparison results back to the processing nodes 806, which, in turn, gain access to the resource 812 when the computed indicia match, as described in more detail below.

Referring to FIG. 8 and the steps of flowchart 9000 in FIG. 9, the EPVA system 802 operates as follows:

Step 9002: The Transaction Distributor 804 receives a user request to access a resource (here, resource 812) and distributes the same user request (matching requests) to each of the processing nodes, here, processing nodes $806_1$, $806_2$. Each of the nodes $806_1$, $806_2$ receive the matching request to access the resource. In one preferred embodiment, the matching request to access a resource is received at each processing node $806_1$, $806_2$ via an intercept library (not shown).

The indicia engines 810 at each of the nodes 806 perform the following functions of steps 9004 and 9006, described with respect to node $806_1$:

Step 9004: Compute indicia of the request to access the resource 812.

Step 9006: Share (communicate) its computed indicia with the comparison node 807.

Step 9008: Comparator 809 in the comparison node 807 compares the computed indicia shared by the processing nodes 806. H ere, the comparator 809 compares the computed indicia received from the indicia engine $810_1$ with the computed indicia received from the indicia engine $810_2$.

Step 9010: A determination is made by the comparator 809 as to whether the computed indicia match. When there are only two processing nodes $806_1$ and $806_2$, a match will require that the computed indicia from each of the processing nodes $806_1$ and $806_2$ match each other. When there are more than two processing nodes 806, a match may require that the computed indicia from one of the nodes (here, processing node $806_1$) matches all of the computed indicia from the other nodes. Alternatively, a voting process may be used with a "majority wins" rule determining if there is a match.

Step 9012: When there is a match, the comparison node 807 communicates this result back to the respective processing nodes 806 which sent their computed indicia to the comparison node 807. The program 815 executing in the processor 808 in at least one of the processing nodes 806 may then perform a first follow-up action. In one example, when there is a match (i.e., when the result of the comparison indicates that the computed indicia of processing node $806_1$ matches the computed indicia of the processing node $806_2$), process in the program $815_1$ executing on the processor $808_1$ of the processing node $806_1$ the matching request to access the resource 812. Similarly, since the processing node $806_2$ will also receive the same indication of a match, the program $815_2$ executing on the processor $808_2$ may likewise access the resource 812.

Step 9014: When there is no match, perform a second follow-up action. In one example, this involves taking an action other than processing the matching request to access the resource 812. Examples of potential actions include responding with null data, responding with redacted data, responding with intentionally corrupted data, shutting down one or more of the nodes or databases, or redirecting to another resource.

In one preferred embodiment, for a respective processing node 806, the access to the resource 812 is controlled by blocking or pausing the execution of the program 815 in the processor 808. That is, when execution of the program 815 is blocked or paused, access to the resource 812 is inhibited. Similarly, for a respective processing node 806, execution of the program 815 in the processor 808 is unblocked or resumed when the result of the comparison indicates that the computed indicia at the processing node 806 in which the program 815 resides matches the computed indicia that is computed from at least one other processing node 806.

In another preferred embodiment, for a respective processing node 806, the access to the resource 812 is controlled by preventing the resource 812 from being opened. In this embodiment, the resource 812 is opened when the result of the comparison indicates that the computed indicia at the particular processing node 806 matches the computed indicia that is computed from at least one other processing node 806.

In the preferred embodiment where the resource 812 is a database, the request to access the resource 812 (database) may not be a part of a transaction request. The request to access the resource 812 (database) may be an open or read request. In the embodiment where the resource 812 is a database, the computed indicia may be a hash of the request to access the resource 812. In the embodiment where the resource 812 is a database, Step 9002 of FIG. 9 (receiving step) may be via a "before trigger" on the database.

3. Multi-Processor Embodiment with Shared Computed Indicia/Shared Resource

Figure 10:
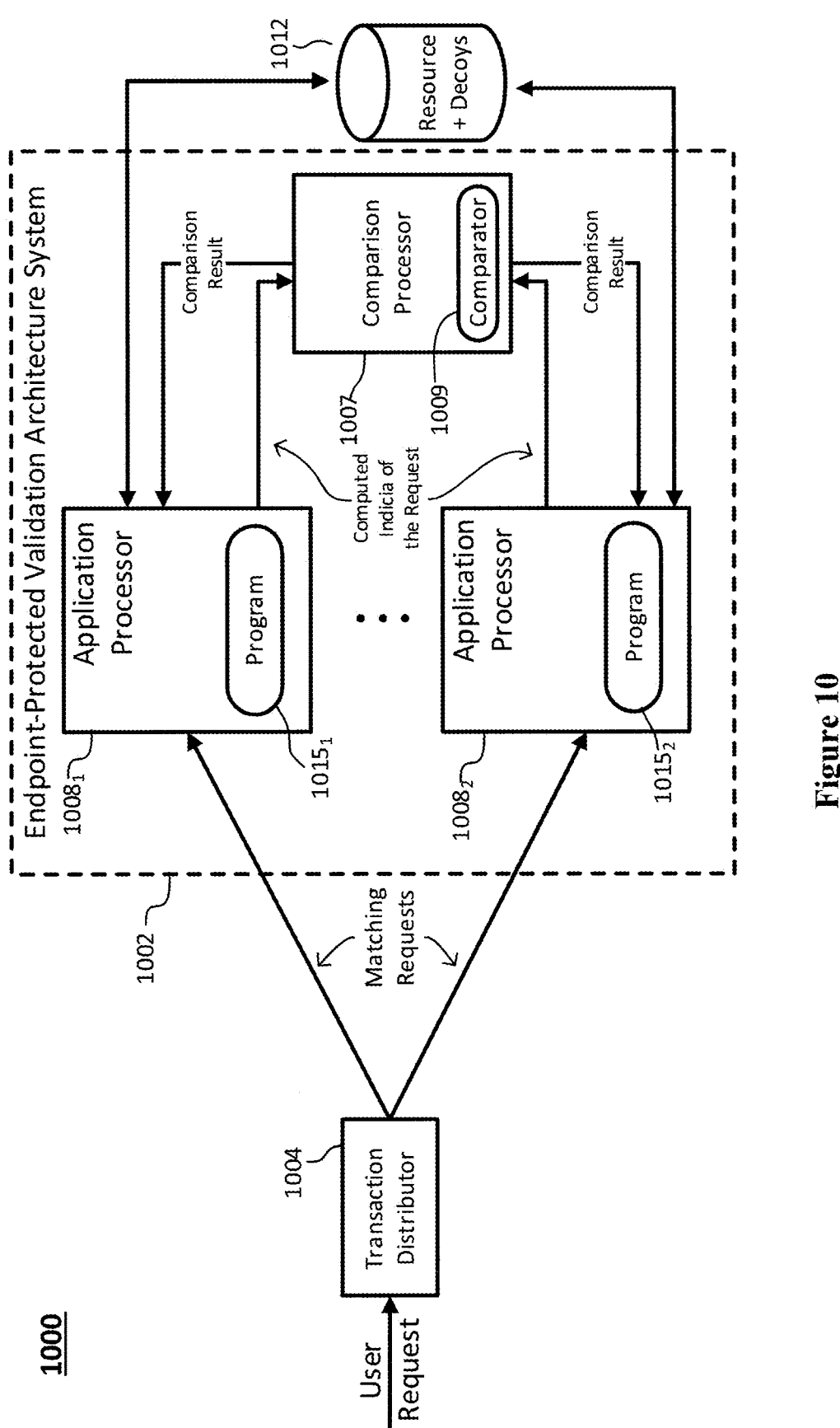
FIG. 10 is an apparatus that shows the hardware/software architecture that implements another preferred embodiment of the present invention.

FIG. 10 is an apparatus 1000 that shows the hardware/software architecture that implements one preferred embodiment of the present invention. FIG. 11 is a flowchart in accordance with one preferred embodiment of the present invention that relates to the apparatus 1000 of FIG. 10.

Referring to FIG. 10, access is controlled to resources in a multi-processor system 1002, also interchangeably referred to herein as an "Endpoint-Protected Validation Architecture (EPVA) system 1002" or "EPVA system 1002." The apparatus 1000 includes Transaction Distributor 1004 and the EPVA system 1002. The EPVA system 1002 includes multiple processors including application processors 1008 and a comparison processor 1007. For ease of illustration, FIG. 10 only shows two application processors 1008, labeled as application processor 1008₁ and application processor 1008₂. Thus, there may be additional application processors (1008₁, 1008₂, . . . 1008ₙ). The apparatus 1000 further includes a resource+decoys 1012 which may be shared among the application processors 1008. (For simplicity, the "resource+decoys" is referred to herein as "resource.") The resource 1012 is accessible to each of the application processors 1008. In one preferred embodiment, the resource 1012 is a database. In other preferred embodiments, the resource is a network port or a hardware device (e.g., GPU, memory region, printer). In one preferred embodiment, the resource 1012 may be a shared resource that is external to the EPVA system 1002, but still accessible to the application processors 1008.

FIG. 10 differs from FIG. 6 in a few different ways. In FIG. 6, outputs of the indicia engines 610 are exchanged between nodes 606, whereas in FIG. 10 computed indicia of the request outputted by the application processors 1008 are shared with (communicated to) the comparison processor 1007 which performs the comparison and communicates the comparison results back to the application processors 1008, which, in turn, gain access to the resource 1012 when the computed indicia match, as described in more detail below.

Referring to FIG. 10 and the steps of flowchart 1100 in FIG. 11, the EPVA system 1002 operates as follows:

Step 1102: The Transaction Distributor 1004 receives a user request to access a resource (here, resource 1012) and distributes the same user request (matching requests) to each of the application processors, here, application processors 1008₁, 1008₂. Each of the application processors 1008₁, 1008₂ receive the matching request to access the resource. In one preferred embodiment, the matching request to access a resource is received at each application processors 1008₁, 1008₂ via an intercept library (not shown). The application processors 1008 perform the following functions of steps 1104 and 1106, described with respect to application processor 1008₁:

Step 1104: Compute indicia of the request to access the resource 1012.

Step 1106: Share (communicate) its computed indicia with the comparison processor 1007.

Step 1108: Comparator 1009 in the comparison processor 1007 compares the computed indicia shared by the application processors 1008. Here, the comparator 1009 compares the computed indicia received from the application processor 1008₁ with the computed indicia received from the application processor 1008₂.

Step 1110: A determination is made in the comparison processor 1007 as to whether the computed indicia match. When there are only two application processors 1008₁ and 1008₂, a match will require that the computed indicia from each of the application processors 1008₁ and 1008₂ match each other. When there are more than two application processors 1008, a match may require that the computed indicia from one of the application processors (here, application processor 1008₁) matches all of the computed indicia from the other application processors 1008. Alternatively, a voting process may be used with a "majority wins" rule determining if there is a match.

Step 1112: When there is a match, the comparison processor 1007 communicates this result back to the respective application processors 1008 which sent their computed indicia to the comparison processor 1007. The application processors 1008 may then perform a first follow-up action. In one example, when there is a match (i.e., when the result of the comparison indicates that the computed indicia computed by the application processor 1008₁ matches the computed indicia computed by the application processor 1008₂), the application processor 1008₁ executes the matching request to access the resource 1012. Similarly, since the application processor 1008₂ will also receive the same indication of a match, the application processor 1008₂ may likewise access the resource 1012.

Step 1114: When there is no match, perform a second follow-up action. For example, take an action other than processing the matching request to access the resource 1012. Examples of potential actions include responding with null data, responding with redacted data, responding with intentionally corrupted data, shutting down one or more of the nodes or databases, or redirecting to another resource.

In one preferred embodiment, for a respective application processor 1008, the access to the resource 1012 is controlled by blocking or pausing the execution of a program 1015₁ in the processor 1008. That is, when execution of the program 1015 is blocked or paused, access to the resource 1012 is inhibited. Similarly, for a respective application processor 1008, execution of the program 1015 in the application processor 1008 is unblocked or resumed when the result of the comparison indicates that the computed indicia at the application processor 1008 in which the program 1015 resides matches the computed indicia that is computed from at least one other application processor 1008.

In another preferred embodiment, for a respective application processor 1008, the access to the resource 1012 is controlled by preventing the resource 1012 from being opened. In this embodiment, the resource 1012 is opened when the result of the comparison indicates that the computed indicia at the particular application processor 1008 matches the computed indicia that is computed from at least one other application processor 1008.

In the preferred embodiment where the resource 1012 is a database, the request to access the resource 1012 (database) may not be a part of a transaction request. The request to access the resource 1012 (database) may be an open or read request. In the embodiment where the resource 1012 is a database, the computed indicia may be a hash of the request to access the resource 1012. In the embodiment where the resource 1012 is a database, Step 1102 of FIG. 11 (receiving step) may be via a "before trigger" on the database.

Configuration and Operation of Endpoint-Protected VA Systems

Endpoint-protected V A systems have a database or other resource such as an ATM that are to be protected from actors targeting the endpoints of the system where user requests are submitted. The overall steps for configuring an Endpoint-Protected VA System consist of the following:

1. Configure a Level 0, 1, 2, or 3 VA system.

2. Inject decoys into the system. Preferably, the decoys are asymmetric among the processing nodes of the VA system. Additionally, they may not be kept in sync with other nodes. The decoys are described in more detail in the Decoys section below.

3. Operate the VA system normally. Valid users will submit transactions/requests at the endpoints of the system such as the user's PC, tablet, or mobile device. The indicia calculated at the nodes of the VA system will be sent to a Comparator processor or node and compared. It will match and the users' transactions/ requests will be successfully processed as a "first follow-up action".

4. If a hacker or other unauthorized user or device gains access to an endpoint and submits a fraudulent request/ transaction then one of the following may happen:

a. Read request such as a select * operation. The request will invariably attempt to return decoy data. Since the decoys are different on the various nodes of the system, the indicia calculated at the nodes will not match.

b. Data modifying request such as an update request encrypting the database. The request will invariably attempt to modify decoy data. Since the decoys are different on the various nodes of the system, the indicia calculated at the nodes will not match.

The indicia calculated at the nodes of the VA system will be sent to a Comparator processor or node and compared. It will not match and the users' transactions/ requests will not be successfully processed as in a "second follow-up action".

Decoys for Endpoint-Protected VA Systems

The decoy resources at the nodes of the VA system may be completely different or may actually partially overlap. In a preferred embodiment, the individual operators of the nodes of the VA system would not know the contents of the decoy resources at their node nor especially the other nodes of the VA system. Some sample decoys may consist of the following:

1. Database Decoys: Decoy rows or columns may be added to the database in some preferred embodiments. A column for containing decoy data might be added to a protected table. The column might simply consist as an encrypted value/flag indicating the decoy status (i.e., decoy=yes, no). The decoy data could be random rows, algorithmically generated rows, a provided list, or even an external lookup database.

2. System Decoys: Fake/decoy printers, disks, CPUs, files, ports, IP addresses, and other system components might be provided.

3. Peripheral Decoys: Fake/decoy input and output devices like check printers, sirens, ATM machines, and other peripheral devices might be provided.

4. Referential Integrity (RI) Decoys: Referential Integrity checks make sure that the database stays consistent. RI is often automatically enforced at the database level, though it may be application enforced. A particular constraint (e.g., a column is not NULL) or foreign key (e.g., a parent row must exist for a child row to be added) may be added to a particular node of the database to serve as a decoy. Accessing it might point to invalid or incorrect information, trigger an investigation or set off alarms. A child row could point to an RI decoy that the system internally knows it has to use as a pass-thru to get to the real parent row, and that knowledge might be kept secret or encrypted. Additional value can be gained when an endpoint-protected VA system utilizes different RI decoys for the different nodes. In that case, the indicia generated by the VA system at the various nodes will diverge and not match in the Comparator. This paragraph refers to databases, but the concept could also pertain to accessing other resources in the system.

5. Differential Decoys: In the case of shared resources, the decoys may be implemented by differential attributes such as metadata (e.g., permissions), access paths, or selection filters between the nodes of the endpoint-protected validation architecture system and the resource such that each node has different access to, or interacts differently, with the resource and related decoys.

Common decoys are decoys that are duplicated on the various nodes of the endpoint-protected VA system. These decoys may have value in a similar way that honeypots have value in a network. However, independent, local decoys are a preferred implementation of the present invention to protect the endpoints. For example, a user request sent to the endpoint-protected system will be caught as possibly fraudulent if it is trying to move funds from account A to account B on one node 1 of a VA system, and account A does not exist on node 2 of the VA system, or has a different balance or flag. The operators of node 1 may not even know that account A is not a real account.

Decoys are preferably realistic looking resources. They may be masked so that the detectability of the decoys would be difficult. Thus, it would not be preferable to allow an operator of one node of a VA system to directly compare the resources on that node with the resources on the other nodes to determine the list of decoy resources. The compare tools to do that type of comparison must be restricted, or themselves be aware of, or able to identify, any subset which should not be directly compared. And, there is still some value in having traditional honeypot decoys on the nodes of the VA system that are not different among the nodes but match.

How many decoys to use? The number of decoys to use in an endpoint-protected VA system should vary depending on the perceived threat. The more threatening, damaging, or dangerous the threat level, the greater the percentage of decoys. Additionally, if the threat is that an attacker would issue just a single row or device attack user request then the decoy density may need to be much higher than if the attacker were poking around the VA nodes and accessing multiple devices, rows, or other resources with a single request affecting a limited number of resources such as database rows. Some examples follow in Table 1.

Various sample requests follow along with the results from operation of preferred embodiments on the data in Table 2 are shown in Table 3.

TABLE 3

| # | Matching User request/ transaction received at Nodes | Results from preferred embodiments |
|---|---|---|
| 1 | Delete all rows from database, e..g. "delete from NameAddr;" (no WHERE clause) | Indicia is calculated on Nodes 1 and 2 and sent to Comparator. Comparator finds Nodes 1 and 2 indicia do not match. Second follow-up action performed (e.g., "abort") |
| 2 | Delete row 996 from database, e.g., "delete from NameA ddr where User-ID-No = 996;" | Node 1 computes indicia, other node has null indicia. Comparator finds Nodes 1 and 2 indicia do not match. Second follow-up action performed (e.g., "abort") |

TABLE 1

| Threat Level | Decoy Density |
|---|---|
| Minor e.g., user database | Sparse, e.g., less than 1% decoys. At 1%, on average, over 100 malware single-resource access attempts would be needed for detection. However, if the attacker used an expansive request like "Select *" then even a sparse decoy density would catch 100% of those types of user requests. |
| Medium e.g., medical database | Thin. E.g., 1 to 9% decoys. An attacker would have a 99% to 90% chanceof a single-resource request succeeding. |
| Large e.g., 911 system database | Dense. E.g., 10 to 99% decoys. An attacker would have a 90% to 1% chance of a single-resource request succeeding. |
| Catastrophic e.g., ballistic missile targeting database | Overwhelming, e.g., greater than 99.99% decoys. An attacker would have only a 1 in ten thousand chance of their single resource-request succeeding. |

To reduce the number of decoys needed, they can be generated or designed or positioned to be more likely than real rows to be selected or affected or otherwise interacted with by naive requests, such as may be submitted by attackers without insider knowledge. This type of decoy design would generally be very system and expected request dependent, and may also unintentionally reveal info on whether any specific row is likely to be a decoy or not to sophisticated attackers who are able to study the system or who have insider knowledge.

Decoy Examples

As an example of decoys in a database, a table called "NameAddr" in a database may consist of the following five columns: User-ID-No, Last-name, First-name, City, State. Various sample decoy data examples are shown in Table 2.

TABLE 2

| Node 1 NameAddr Table | Node 2 NameAddr Table | Decoy Type |
|---|---|---|
| | 996 Clause, Santa, North Pole, Canada | Decoy row in Node 2 database |
| 997 Smith, Clark, Dreshe rPA | 997 Smith, Clark, Dresher, PA | All okay (not a decoy) |
| 998 Smith, Liz, Dresher PA | 998 Smith, Liz, Elkins Park, PA | Decoy column value- City column mismatch |
| 999 Jones, John, Washington, DC . . . | 999 Jones, Jonathan, Washington, DC | Decoy column value- first name mismatch |

TABLE 3-continued

| # | Matching User request/ transaction received at Nodes | Results from preferred embodiments |
|---|---|---|
| 3 | Encrypt row 998. | Indicia is calculated on Nodes 1 and 2 and sent to Comparator. Comparator finds Nodes 1 and 2 indicia do not match. Second follow-up action performed (e.g., "abort") |
| 4 | Read all rows, e.g., "select * from NameAddr;" | Indicia is calculated on Nodes 1 and 2 and sent to Comparator. Comparator finds Nodes 1 and 2 indicia do not match. Second follow-up action performed (e.g., "abort") |
| 5 | Read row 997, e.g., "select * from NameA ddr where User-ID-No=997;" | Indicia is calculated on Nodes 1 and 2 and sent to Comparator. Comparator finds Nodes 1 and 2 indicia match. First follow-up action performed (e.g., "commit") |

Other resources like files, tables, and devices might be utilized as the decoys. Some examples of resource decoys are shown in Table 4 for files, tables, devices, and system memory.

TABLE 4

| | Files | Tables | Devices | Memory |
|---|---|---|---|---|
| Example of decoy | NameA ddr2.doc | TableABC123 | Printer.Mailroom | 0x78A B 2200: 0xFFFFFFFF |
| Matching User request/transaction received at Nodes | Copy or encrypt file NameA ddr2.doc to USB drive | Select * from TableABC123 | Print 1000 black pages | Erase memory locations 0x78A B 2200: 0xFFFFFFFF |
| Result if successful on production data | Stolen or encrypted file | Exfiltrated contents of table | Wasted paper and toner | Computer crash |
| Result from preferred embodiments | Indicia for user request or results of the request is calculated on Nodes 1 and 2 and sent to a Comparator. Comparator finds Nodes 1 and 2 indicia do not match. Second follow-up action performed (e.g., "abort", alert, pause, return false information) | | | |

Endpoint-Protected VA System Method

Each node receives matching requests to access the resources. As is typical with Level 1, 2, and 3 VA systems, matching indicia from transaction responses, or matching indicia of requests (or associated responses) in VA systems does not necessarily mean that the matching requests are identical. Various parts of the request may differ for many reasons, such as the following:

A. The resource IP, or location details, such as volume, partition, table, fully qualified or relative file location may be different to allow each participating EPVA node to access the appropriate resource, or their version of the resource.

B. Different authentication methods or user access details for the resource.

C. The resources may have different IDs or data offsets

D. There may be different data types used which require conversion, e.g., different column data types, different encodings such as ASCII vs EBCDIC, big endian vs little endian.

E. Different column or table names may be in use.

F. Different protocol versions, or APIs may be in use.

G. Different rounding algorithms on a calculation used in generating the request/response, or the usage of different floating-point implementations.

In some cases, the request may not be fully converted by the requestor submitting the matching requests: the TD, nodes, or RCs may do their own mapping or conversion on the request to allow correct access to the resource. Additionally, to the extent that the request produces a response, the nodes or another part of the system may need to do similar mapping or conversion, but in reverse to suit the requestor.

In order to make the indicia for requests, or associated output or responses, match between the nodes (i.e., when no decoys are involved), the indicia generation may exclude portions of the request (or output, or responses) which would vary between nodes, or any mapping, conversion, rounding, or data truncation may need to be done or undone prior to the indicia generation. An inexact match could also include a tolerance such as the match is accepted if the difference is within one thousandth of a percent. Fuzzy matching could also involve utilizing only a subset of the columns affected or used in the request. In this way, "match" may be an identical match, but it can also encompass forms of fuzzy or intelligent inexact matching. The same sort of fuzzy matching can be applied to the associated response if indicia is being calculated from the associated response. A rules engine may be responsible for determining and/or applying the methods used for matching.

In a Validation Architecture Application Framework, the user matching requests may be sent to the nodes by a resource known as a Transaction Distributor. The Transaction Distributor (TD), an attacker able to access the TD's data, or an attacker which is otherwise able to intercept the requests, may be prevented from modifying or corrupting the requests if the requests are well-protected (e.g., with encryption, or if certificates/signing are used to ensure that the requests have not been modified). The TD's data could also be protected from disclosure with control measures such as ACLs and encryption. Additionally, if more than two nodes are operating in the EPVA system, the requests may contain the subset of nodes used to validate the requests. Note, in some cases, it is desirable for the TD to modify requests in an expected way, as discussed elsewhere in this disclosure. For example, request modification can be used to map row IDs or column names, or to indicate a subset of nodes that will participate in the indicia exchange. To allow this with protected requests, the TD may have access to data such as the signing or encryption keys needed to re-sign the modified requests or to encrypt/decrypt them.

At each node, or accompanying or part of each RC, is an indicia engine that accomplishes the following:

(i) computes indicia from the request to access the resource, or alternately the results of the request to access the resource (e.g., the audit trail log data), or the application response from the request to access the resource (e.g. the database rows returned or the command for the ATM to deliver $100 cash).

(ii) exchanges or shares its computed indicia with other nodes or RCs as needed, and (iii) compares directly, or in a Comparator, its computed indicia with the indicia resulting for the matching requests. The indicia may be received from other nodes or RCs or also computed locally.

First and Second Follow-Up Actions

If the indicia compared matches then a "first follow-up action" is performed which is generally what was expected to happen with the submitted user request/transaction. However, if the indicia compared does not match, then a "second follow-up action" is performed which may be completely different from the first follow-up action.

The node will process in the processor in at least one of the nodes the matching request to access the resource (usually only) as a first follow-up action when the result of the comparison in the Indicia Engine indicates that the computed indicia matches the computed indicia received from at least one other node. In some embodiments the matching will require that the requests are identical, however, in most cases, there may be parts of the request such as the TC P/IP address of the source or recipient node, request/tx IDs, timestamps, certificates, or user info that differs, so that "matching" means that the substantially important part of the request w ill be used in computing and matching the indicia. A rules engine may be utilized to determine what criteria apply to the indicia matching, which may differ for different types or sources/targets or purposes for the requests.

Examples of second follow-up action control of access to the resource may be accomplished by one or more of the following:

A. A program may be executing on the processor, and access to the resource can be controlled by blocking or pausing the execution of the program in the processor (e.g., "freezing" execution, or disallowing the start of execution). The execution of the program in the processor can be unblocked or resumed (e.g., "thawed") as a first follow-up action when the result of the indicia comparison indicates that the computed indicia matches the computed indicia received from at least one other node.

B. The access to the resource can be controlled by preventing the resource from being opened, such as by a call to an open( ) API, or queried, such as by a call to a read( ) API. The access control can be implemented in several ways, and at different levels, including in the operating system or kernel, a userspace program, a hardware or operating system interrupt or intercept, as an application intercept, a database trigger, user exit, a request proxy, a firewall, or a network device or driver. Access to the resource can be allowed as a first follow-up action when the result of the indicia comparison indicates that the computed indicia matches the computed indicia received from at least one other node.

C. In cases when the indicia do not match, an executing program may be terminated, resources may betaken off-line, systems or nodes shut down, or automatically remediated among other possibilities.

Alternate embodiments of the invention include the prior disclosed embodiments plus (and/or substituting) the following:

A. The resource may be a database, part of the database, or portion of the data in the database. Examples of databases which could be used include HPE SQL/M P, SQL/M X, or Enscribe.

B. The resource request may include a table or file open or read request, or a lock/unlock of a table or file, or a portion thereof.

C. The resource may be a network port, hardware device, or an application executing in a processor.

D. The request to access the database/resource may not be part of a transaction request.

E. The request to access the database/resource could be part of a transaction request, and the transaction request could actually modify the database/resource if it is allowed to proceed.

F. The access to the database/resource may be non-logged and non-audited.

G. An intercept library may be used to capture the requests made on the resource. For example, a duplicated user request may be received at the nodes of the VA system, but the actual requests validated are captured by database before triggers or an operating system intercept library. E.g., database read calls attempting to steal data are intercepted and validated between the nodes of the VA system. The intercept could include an intercept library which may be attached to the program/process, as well as an intermediary process or device driver that sits between the application and the resource, such as the file system, operating system (O/S), or other program/thread. The intercept can intercept the messaging or signals and perform the indicia work. As an example, HPE NonStop has some features to intercept the messaging, for example CMON and SAFEGUARD. These features receive requests to do operations like file opens, closes, and other operations, and then look at rules, mostly security related, to see if access should be allowed or not. An application or operating system user exit may be able to operate like an intercept library.

H. The computed indicia may be a hash of the request to access the database/resource.

I. The response to the request to access the resource may be taking a second follow-up action other than processing the matching request to access the resource when the result of the comparison of indicia indicates that the computed indicia does not match. The action taken when the indicia do not match may be one or more of returning null data, returning redacted/tokenized data, returning intentionally corrupted/fake data, shutting down one or more of the nodes or databases, or redirecting the request to another resource.

J. The VA system can consist of two or more nodes. Alternately, if the system includes more than two nodes, all nodes or a chosen subset (which can be selected randomly, algorithmically, by the user, by the TD, by another component such as a load balancer, or by the system designer) participate in the method to process the request to access the resource. In yet another embodiment where more than two nodes are selected to participate in the processing, a quorum may be used, such as a majority of participating nodes wins, to determine if the request to access the resource is allowed.

K. The nodes of the V A system may all be located in one system cabinet, in the cores of a single multi-core CPU, share a single core, or multiple cores as Virtual machines, containers, or processes being swapped in and out of execution. In this case, the exchanging of indicia with the nodes of the VA may actually consist of utilizing a shared memory or cache location instead of a network.

L. In yet another embodiment, the indicia engine at the nodes only accomplishes the following two steps (i) computes indicia of the request to access the resource, and (ii) exchanges (or shares) its computed indicia with at least one other node which is called a comparison node. A Comparator at the comparison node compares the computed indicia from the at least two other nodes to make a decision on the indicia matching which can be used in determining whether to allow the request to access the resource.

M. Prior art schemes such as the queueing of indicia used in U.S. Pat. No. 11,768,822 (Holenstein et al.) may be used in the indicia matching process when there are multiple simultaneous requests made of the VA system and out of order or delayed processing might result.

N. Business rules, programmed rules, or user supplied rules or operations could be utilized by the nodes of the VA system (e.g., in a rules engine) when deciding on nodes to participate in the validation process, when calculating indicia and making matches.

O. In a default mode of operation, access to the resources protected by the VA might be accomplished by simply using a prior art VA system and logging as transactions the resource access requests in a way such as an ACID transaction prior to granting access to the resource. That is, only if the prior art VA system approved of the request or resulting operations would they proceed. E.g., opens/reads/queries could be logged as real or virtual logged transactions PRIOR to completing the first or subsequent operation(s). A prior art VA system (typically operating as a Level 2 synchronous VA) could then work, with the logged transactions to influence/control the processing of the real request.

P. Different data center providers, cloud hosts, hardware manufacturers, operating suppliers, application providers, installers, operators, and support staff among others may independently support the nodes used in the VA in order to provide independence and isolation among the nodes. This can make it much harder for attackers to infiltrate multiple nodes and defeat the VA system.

Q. Combinations and variations of the above embodiments.

Expanded Embodiments

In alternate embodiments, the requests may be redirected, or proxied through, another resource for second follow-up actions such as the following:

A. Monitoring and logging requests and other activity.

B. Tampering with or modification of the request or response content.

C. Isolating the request, and optionally any of it's results, e.g., for study.

D. Slow-walking, adjusting priority (up/down), or delaying of request processing.

E. Requiring external approval to allow the request to go forward.

Further alternate embodiments are described below in this section.

The real, or redirected alternate resource can also receive the request, but behave differently as a second follow-up action in the case of non-matching indicia. For read requests, rather than providing the real data as-is, the requested resource or an alternate resource the request was sent to may provide simulated data, or redacted/anonymized/tokenized/obfuscated data, or encrypted data, depending in part on what the data is and what makes it valuable or confidential. In the case of write requests, they may simply be denied or may be handled in a way which does not impact the real data such as ignoring changes, or keeping a record of the changes in an alternate temporary table or in memory so that the unauthorized user is not made aware that they have been detected and are not actually interacting with the intended resource normally. The requests, changes, and details of this faked resource access could be logged for later analysis.

The resource, or an alternate resource could also provide data (real, simulated, corrupted, error filled) with canary values mixed in. The presence of the canary values in the data may allow detection/identification of where the data is used or spread to in the future, potentially assisting with identifying attackers and people they work with. The canary values can also help to identify real, authorized, should-be-allowed uses/users/applications which are not configured to access the resource properly. Providing canary values to these allowable, but blocked users can, among other things, help with the testing and rollout of the protected resources by allowing easy identification of misconfigured users. The canary values can also help with identifying issues during configuration of new users of the protected resources.

The resource, an alternate resource, or the RC as a second follow-up action could pretend to have problems, such as timeouts or other errors processing the request in an effort to avoid the suspicion of an attacker and provide more time for other mitigating actions to be taken or provide time to gather more information about a potential attack.

The RC could act like a resource proxy and accomplish the previously mentioned data/request modifications to sanitize the requests or make the access safe/allowable instead of the resource or an alternate resource.

Some requests, such as low risk requests, or those accessing low value or non-confidential data, could simply be allowed regardless of whether the indicia match. This could, as an example, allow bypassing the need for request duplication for requests such as high frequency queries or for those which need low latency, where it is not critical to the system. The rules engine can be configured to make this determination, using different parameters to meet various business objectives.

The RC in some embodiments only controls the request to the resource. In other embodiments, if the request is allowed to proceed, the RC controls the response to the request, which may include the calculation and matching of indicia for the response. So, in that case, the processor may not get the response corresponding to the request, but instead get no response or a modified response such as described in other embodiments herein. In some alternate cases, a first response received could be forwarded along prior to any validation if response speed is more critical than the validity check. Various second follow-up actions can be taken later if the delayed check does not match. Such matching can also help check other intermediary resources, or the RCs themselves, in cases such as multiple requests done against a single resource, which follow different paths or use different RCs.

In some system designs, multiple RCs may control access to a common shared resource, and each RC may receive a separate matching request to access that resource. A single RC may also receive multiple matching requests to a single resource. In these cases, where there are multiple matching requests accessing a common resource through one or more RCs, the RCs may coordinate to (or the single RC may elect to) only fully process a subset of the matching requests. An example of this is only fully processing one of the matching requests to avoid multiple reads/writes to a single database, which would be unnecessary and potentially detrimental to the data. In the case of reads, this could also apply to when multiple resources are being used, as in most cases they would all be expected to return the same data. Processing all requests would be wasteful and unnecessary, unless there is some use for the duplicated requests, such as additional validation or indicia matching being performed on the response data. The RCs which actually handle the request may optionally share responses with other RCs which did not process the request if there is a need for the other requests to receive a response.

Some embodiments for how the processor or RC can control/prevent access to a resource or parts of a resource as a second follow-up action include:

A. Database or file locks. These can, for example, be implemented at the operating system level or database/file system level. Some types of locks include table locks, range locks, and row locks.

B. Mutexes may, for example, be used to control access to memory and thread resources.

C. Network access, for example, by controlling access to ports, IP addresses, subnets, the physical connection, or V LAN.

D. Pausing or stopping execution of the process requesting access.

E. Disabling intermediary resources such as the network, storage controllers, memory controllers, system interconnections, user connection.

F. Disconnecting or pausing the connection of the requesting user/process

G. Disallowing access to libraries or resources needed to process the request or response such as decryption APIs and keys.

H. Pausing, stopping, or disconnecting the resource.

In cases where the RC is acting as a resource proxy, which can allow requests by processing/proxying them (in effect accessing the resource on behalf of the user/requestor or processor), the request/response control can be accomplished by the RC delaying, not processing/proxying the requests or response, or otherwise dropping, redirecting, or modifying the request or response. A similar form of resource access control can also be put into effect when the RC has control over the interconnection or intermediary resources between the user and the processor, the user and the resource, or the processor and the resource, allowing the RC to take actions such as dropping or redirecting the connection, dropping individual packets, or adding effects such as filters which modify the data or requests sent over the connection.

The originating user/device/process/other entity requesting access to the resource is also a resource which may be part of the same or another system which may also be an VA system. The originating user/device/process/other entity resource, or even another resource, may in some cases be separately accessed by the requested resource when providing a response or taking other action. This separate access and its enabling requests may utilize the same or another RC or set of RCs.

Actions taken to control access to a resource may have their effects isolated to the specific request being handled, or the entire node or system as a whole, or resources external to the system. In particular, if requests lead the processor, RC, or rules engine to conclude that there is an attack underway, components such as the compromised nodes, compromised network segments, target resources, or even the entire system may be taken offline.

ADDITIONAL CONSIDERATIONS

The various components described in FIGS. 4A-4C, 6, 8, and 10 may be implemented by computers that perform the intended functionality by executing instructions (e.g., program code). These components include the "Transaction & Request Distributor/Duplicator" (which is also interchangeably referred to as a "Transaction Distributor") of FIGS. 4A-4C, the Transaction Distributor of FIGS. 6, 8, and 10; the Processor, Resource Controller, and Indicia Engine of FIGS. 4A-4C; the node processors and node indicia engines of FIG. 6; the node processors and their respective programs, node indicia engines, and comparator in the comparison node of FIG. 8; and the application processors and their respective programs, and comparator of FIG. 10.

Similarly, the functionality of the rules engine of FIGS. 4A-4C is fully described above and is likewise implemented by executing appropriate program code. M ore specifically, the rules engine is a software system that executes a set of defined rules in order to make decisions or take actions. The rules engine evaluates data and applies the rules to determine an outcome.

These components and the rules engine can also be included in an article of manufacture (e.g., one or more computer program products) having, for instance, non-transitory, tangible computer readable storage media. The storage media has computer readable program code stored therein that is encoded with instructions for execution by a processor for providing and facilitating the mechanisms of these components and the rules engine. Stated another way, the computer program product includes a computer readable medium tangibly embodying non-transitory computer-executable program instructions thereon, that, when executed, cause one or more computing devices to perform the functions of these components and the rules engine. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method for performing an action on data in databases of a multi-node system, each node including an indicia engine, each node having access to a respectively associated database, each of the databases having a first subset of data that match each other and which is kept in synchronization with each other, at least one of the databases having a second subset of data that intentionally does not match a subset of data in at least one of the other databases and which is not kept in synchronization with the at least one of the other databases, the method comprising:

(a) receiving at each node a plurality of matching requests to perform an action on data in the database associated with each node, wherein at least one of the matching requests is a request to perform an action on at least a part of the first subset of data that match each other and which is kept in synchronization with each other, and wherein at least one of the matching requests is a request to perform an action on at least a part of the second subset of data that intentionally does not match a subset of data in at least one of the other databases and which is not kept in synchronization with the at least one of the other databases;

(b) computing, in the indicia engine at each node, for each of the matching requests, indicia of the request to be performed on data in the database associated with each node;

(c) sending the indicia computed at each node for each of the matching requests to a comparator;

(d) outputting, by the comparator, for each of the matching requests a result of a comparison of the indicia;

(e) performing either a first follow-up action or a second follow-up action depending upon the result of the comparison for each of the matching requests, wherein the first follow-up action is performed when the result of the comparison shows a match, the match indicating that the request to be performed is performed only on the first subset of data in the database associated with each node that match each other and which are kept in synchronization with each other, and wherein the second follow-up action is performed when the result of the comparison shows a mismatch, the mismatch indicating that the request to be performed is performed at least in part on the second subset of data in the database associated with one of the nodes that intentionally does not match a subset of data in at least one of the other databases and which is not kept in synchronization with the at least one of the other databases.

2. The method of claim 1 wherein at least one of the matching requests to perform an action on data in the database associated with each node is an update request, and wherein the first follow-up action completes the results of the update request on data in the database associated with each node, and the second follow-up action reverts the results of the update request on data in the database associated with each node.

3. The method of claim 1 wherein at least one of the matching requests to perform an action on data in the database associated with each node is a read request, and wherein the first follow-up action returns the results of the read request performed on data in the database associated with each node, and the second follow-up action does not return the results of the read request performed on data in the database associated with each node.

4. The method of claim 1 wherein the database associated with each node has metadata associated with the data in the database, the metadata includes permissions which are enforced by the database, the metadata for the first subset of data is included in the first subset of data, and the metadata for the second subset of data is included in the second subset of data.

5. The method of claim 1 wherein the databases each have rows, and wherein at least one of the matching requests is to perform an action on data in an identified row of the databases associated with each node.

6. The method of claim 1 wherein at least one of the matching requests is electronically submitted by a user of the multi-node system who has credentials to submit requests to the multi-node system, and the second follow-up action is revoking or altering the user's credentials to restrict submission of subsequent requests to the multi-node system.

7. The method of claim 1 wherein the comparator is located at one of the nodes and each of the other nodes sends their respective indicia of the results of the action performed on data in the database to the comparator at the one node.

8. The method of claim 1 wherein the comparator is located in a comparison engine external to all of the nodes and each of the nodes sends their respective indicia of the results of the action performed on data in the database to the comparison engine.

9. The method of claim 1 wherein at least one of the databases includes a third subset of data which intentionally does not match either the first subset of data or the second subset of data, and which is not kept in synchronization with at least one of the other databases, wherein the second follow-up action is performed when the result of the comparison shows a mismatch, the mismatch indicating that the request to be performed is performed at least in part on the third subset of data in the database associated with one of the nodes that intentionally does not match a subset of data in at least one of the other databases and which is not kept in synchronization with at least one of the other databases.

10. A computer program product for performing an action on data in databases of a multi-node system, each node including an indicia engine, each node having access to a respectively associated database, each of the databases having a first subset of data that match each other and which are kept in synchronization with each other, at least one of the databases having a second subset of data that intentionally does not match a subset of data in at least one of the other databases and which is not kept in synchronization with the at least one of the other databases, the computer program product comprising a non-transitory computer readable storage medium tangibly embodying non-transitory computer executable program instructions thereon, that, when executed by one or more processors, cause one or more computing devices to:

(a) receive at each node a plurality of matching requests to perform an action on data in the database associated with each node, wherein at least one of the matching requests is a request to perform an action on at least a part of the first subset of data that match each other and which is kept in synchronization with each other, and wherein at least one of the matching requests is a request to perform an action on at least a part of the second subset of data that intentionally does not match a subset of data in at least one of the other databases and which is not kept in synchronization with the at least one of the other databases;

(b) compute, in the indicia engine at each node, for each of the matching requests, indicia of the request to be performed on data in the database associated with each node;

(c) send the indicia computed at each node for each of the matching requests to a comparator;

(d) output, by the comparator, for each of the matching requests a result of a comparison of the indicia;

(e) perform either a first follow-up action or a second follow-up action depending upon the result of the comparison for each of the matching requests, wherein the first follow-up action is performed when the result of the comparison shows a match, the match indicating that the request to be performed is performed only on the first subset of data in the database associated with each node that match each other and which are kept in synchronization with each other, and wherein the second follow-up action is performed when the result of the comparison shows a mismatch, the mismatch indicating that the request to be performed is performed at least in part on the second subset of data in the database associated with one of the nodes that intentionally does not match a subset of data in at least one of the other databases and which is not kept in synchronization with the at least one of the other databases.

11. The computer program product of claim 10 wherein at least one of the matching requests to perform an action on data in the database associated with each node is an update request, and wherein the first follow-up action completes the results of the update request on data in the database associated with each node, and the second follow-up action reverts the results of the update request on data in the database associated with each node.

12. The computer program product of claim 10 wherein at least one of the matching requests to perform an action on data in the database associated with each node is a read request, and wherein the first follow-up action returns the results of the read request performed on data in the database associated with each node, and the second follow-up action does not return the results of the read request performed on data in the database associated with each node.

13. The computer program product of claim 10 wherein the database associated with each node has metadata associated with the data in the database, the metadata includes permissions which are enforced by the database, the metadata for the first subset of data is included in the first subset of data, and the metadata for the second subset of data is included in the second subset of data.

14. The computer program product of claim 10 wherein the databases each have rows, and wherein at least one of the matching requests is to perform an action on data in an identified row of the databases associated with each node.

15. The computer program product of claim 10 wherein at least one of the matching requests is electronically submitted by a user of the multi-node system who has credentials to submit requests to the multi-node system, and the second follow-up action is revoking or altering the user's credentials to restrict submission of subsequent requests to the multi-node system.

16. The computer program product of claim 10 wherein the comparator is located at one of the nodes and each of the other nodes sends their respective indicia of the results of the action performed on data in the database to the comparator at the one node.

17. The computer program product of claim 10 wherein the comparator is located in a comparison engine external to any of the nodes and each of the nodes sends their respective indicia of the results of the action performed on data in the database to the comparison engine.

18. The computer program product of claim 10 wherein at least one of the databases includes a third subset of data which intentionally does not match either the first subset of data or the second subset of data, and which is not kept in synchronization with at least one of the other databases, wherein the second follow-up action is performed when the result of the comparison shows a mismatch, the mismatch indicating that the request to be performed is performed at least in part on the third subset of data in the database associated with one of the nodes that intentionally does not match a subset of data in at least one of the other databases and which is not kept in synchronization with at least one of the other databases.

* * * * *